(12) United States Patent
Uno et al.

(10) Patent No.: US 9,318,779 B2
(45) Date of Patent: Apr. 19, 2016

(54) ELECTRIC ENERGY STORAGE UNITS CONNECTED IN SERIES AND SELECTIVELY CHARGED/DISCHARGED VIA A BALANCING CIRCUIT OR DIRECTLY FROM A CHARGER OR TO A LOAD

(75) Inventors: Masatoshi Uno, Sagamihara (JP); Akio Kukita, Sagamihara (JP); Kazushige Ito, Fussa (JP); Tsutomu Sekido, Fussa (JP)

(73) Assignees: Japan Aerospace Exploration Agency, Tokyo (JP); Japan Capacitor Industrial Co., Ltd., Tokyo (JP)

( * ) Notice: Subject to any disclaimer, the term of this patent is extended or adjusted under 35 U.S.C. 154(b) by 813 days.

(21) Appl. No.: 13/411,480

(22) Filed: Mar. 2, 2012

(65) Prior Publication Data

US 2012/0194138 A1    Aug. 2, 2012

Related U.S. Application Data

(63) Continuation of application No. PCT/JP2010/065041, filed on Sep. 2, 2010.

(30) Foreign Application Priority Data

Sep. 2, 2009    (JP) ................................. 2009-202684

(51) Int. Cl.
| | |
|---|---|
| H02J 7/00 | (2006.01) |
| H01M 10/44 | (2006.01) |
| H02J 7/34 | (2006.01) |

(52) U.S. Cl.
CPC ............ *H01M 10/44* (2013.01); *H02J 7/0016* (2013.01); *H02J 7/0019* (2013.01); *H02J 7/345* (2013.01)

(58) Field of Classification Search
CPC .................................................... H02J 7/0018

USPC .................................. 320/121, 118, 120, 122
See application file for complete search history.

(56) References Cited

U.S. PATENT DOCUMENTS

| | | | |
|---|---|---|---|
| 3,100,851 A | 8/1963 | Ross | |
| 4,238,820 A | 12/1980 | Naaijer | |

(Continued)

FOREIGN PATENT DOCUMENTS

| | | | |
|---|---|---|---|
| CN | 1057133 A | 12/1991 | |
| CN | 101297458 A | 10/2008 | |

(Continued)

OTHER PUBLICATIONS

K.Z. Guo, et al., "Comparison and Evaluation of Charge Equalization Technique for Series Connected Batteries", Proc. IEEE PESC '06, pp. 1-6 (2006).

*Primary Examiner* — Richard Isla Rodas
*Assistant Examiner* — David V Henze-Gongola
(74) *Attorney, Agent, or Firm* — McDermott Will & Emery LLP

(57) ABSTRACT

An electric energy storage system is designed to equally utilize electric energy storage banks during charging/discharging, and keep fluctuation of an input voltage from a charger or an output voltage to a load, within an arbitrary range, while equally utilizing the electric energy storage banks during charging/discharging. The electric energy storage system comprises an electric energy storage module, a charger, a balancing circuit, a voltage detection section, taps led out, respectively, from one of opposite terminals of the electric energy storage module and/or the other terminal of the electric energy storage module and/or one or more of series-connection points between the electric energy storage units, through respective switches, and a switch control section for switching the switches such that one of the taps is connected to one of opposite terminals of the charger. The switch control section is operable to sequentially switch the switches according to progress of the charging.

14 Claims, 24 Drawing Sheets

(56) References Cited

U.S. PATENT DOCUMENTS

| | | | |
|---|---|---|---|
| 5,453,643 A | 9/1995 | Yang | |
| 5,483,433 A | 1/1996 | Yang | |
| 5,659,237 A * | 8/1997 | Divan et al. | 320/119 |
| 5,710,504 A * | 1/1998 | Pascual et al. | 180/65.8 |
| 6,121,751 A | 9/2000 | Merritt | |
| 7,288,919 B2 | 10/2007 | Morita | |
| 7,453,237 B2 | 11/2008 | Yamamoto | |
| 7,898,223 B2 | 3/2011 | Takeda et al. | |
| 2004/0113586 A1 | 6/2004 | Chen | |
| 2006/0103349 A1 | 5/2006 | Yamamoto | |
| 2008/0030167 A1 | 2/2008 | Hsu et al. | |
| 2008/0252266 A1 | 10/2008 | Bolz et al. | |
| 2009/0134851 A1* | 5/2009 | Takeda et al. | 323/234 |
| 2009/0273321 A1* | 11/2009 | Gotzenberger et al. | 320/166 |
| 2011/0057617 A1* | 3/2011 | Finberg et al. | 320/118 |
| 2012/0194138 A1 | 8/2012 | Uno et al. | |
| 2012/0200163 A1 | 8/2012 | Ito et al. | |

FOREIGN PATENT DOCUMENTS

| | | |
|---|---|---|
| CN | 100514741 C | 7/2009 |
| JP | 54-126931 A | 10/1979 |
| JP | 2-123928 A | 5/1990 |
| JP | 06-225462 A | 8/1994 |
| JP | 07-115728 A | 5/1995 |
| JP | 8-182212 A | 7/1996 |
| JP | 08-308249 A | 11/1996 |
| JP | 10-32936 A | 2/1998 |
| JP | 2000-209775 A | 7/2000 |
| JP | 2002-345157 A | 11/2002 |
| JP | 2003-134686 A | 5/2003 |
| JP | 2007-166691 A | 6/2007 |
| JP | 2007-312517 A | 11/2007 |
| JP | 2008-219964 A | 9/2008 |
| TW | 201103229 A | 1/2011 |

\* cited by examiner

PRIOR ART

PRIOR ART

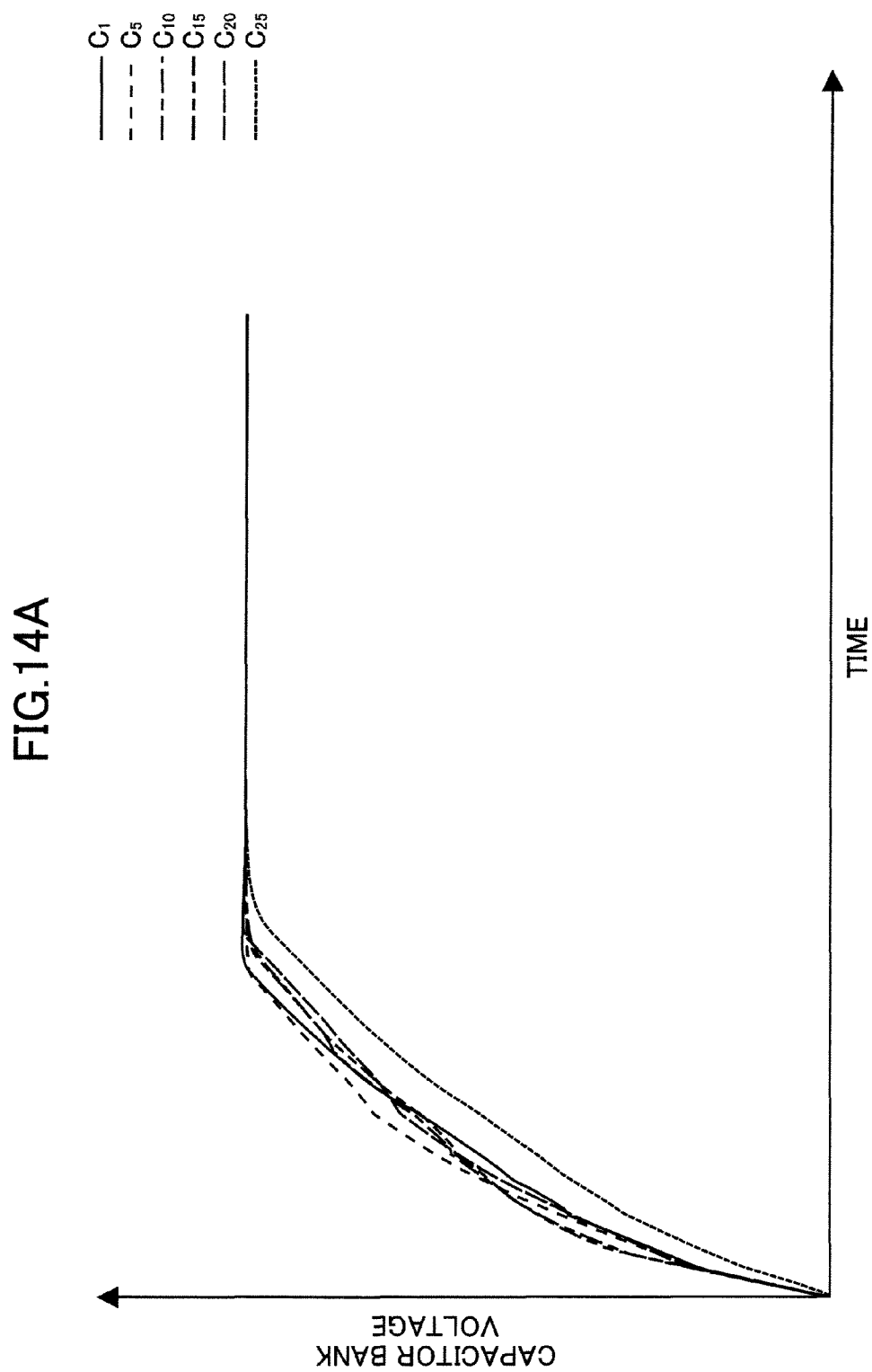

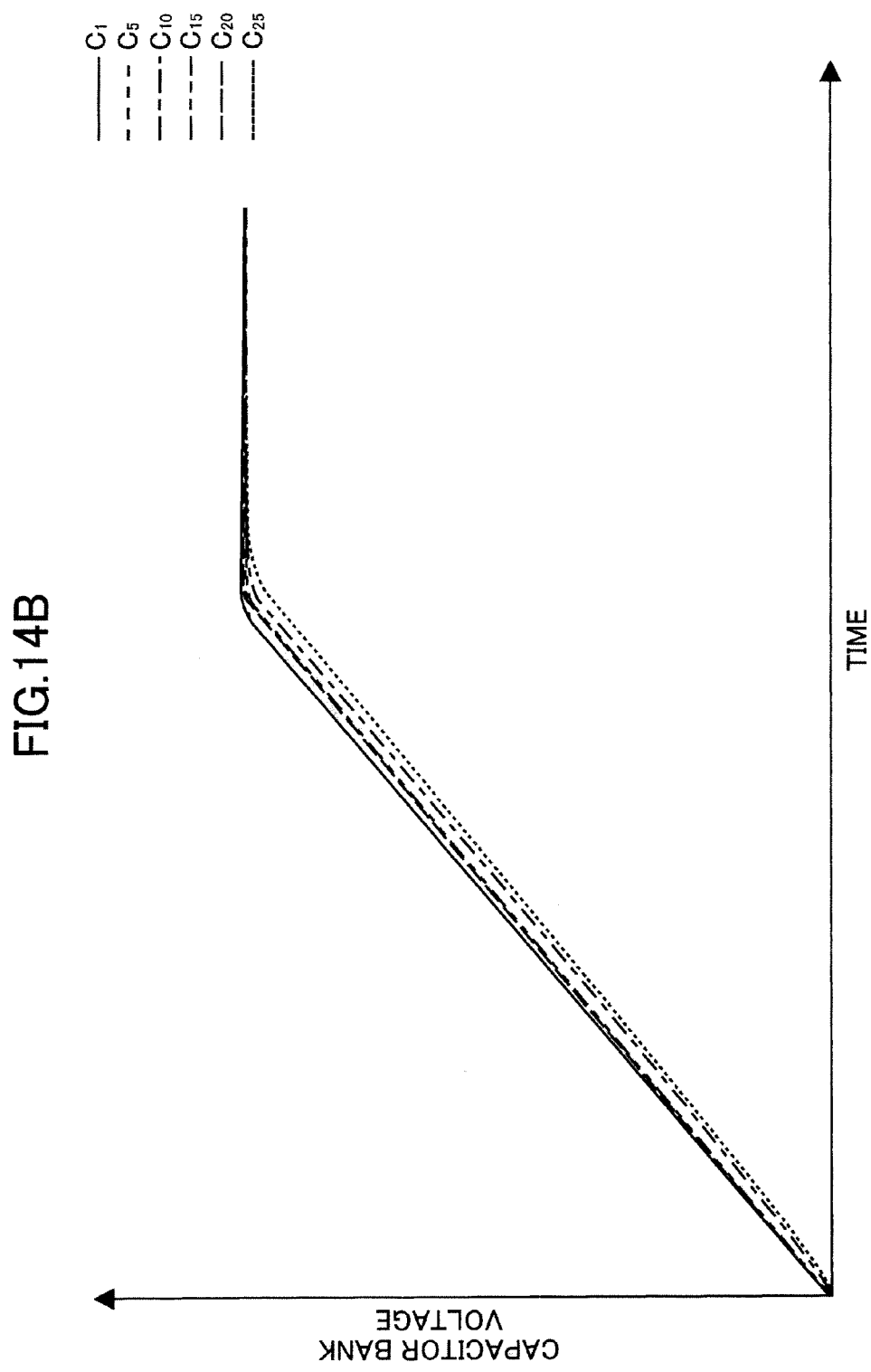

ical energy storage units connected in series, each of the plurality of electric energy storage units having one electric energy storage bank or a plurality of electric energy storage banks connected in series; a charger for charging at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a voltage across the charger; a plurality of taps led out, respectively, from one of opposite terminals of the electric energy storage module and/or one or more of a plurality of series-connection points between the electric energy storage units, through respective switches; and a switch control section for switching the switches such that one of the plurality of taps is connected to one of opposite terminals of the charger, wherein the switch control section is operable, during a charging period, to sequentially switch the switches according to progress of the charging, based on a detection result from the voltage detection section, so as to control the number of at least one of the plurality of electric energy storage units which is to be charged not via the balancing circuit but directly from the charger.

ELECTRIC ENERGY STORAGE UNITS CONNECTED IN SERIES AND SELECTIVELY CHARGED/DISCHARGED VIA A BALANCING CIRCUIT OR DIRECTLY FROM A CHARGER OR TO A LOAD

CROSS-REFERENCES TO RELATED APPLICATIONS

This application is a continuation of International Patent Application No. PCT/JP2010/065041 filed on Sep. 2, 2010, which claims priority from Japanese Patent Application No. 2009-202684 filed on Sep. 2, 2009, all of which are hereby incorporated by reference in their entirety for all purposes.

FIELD

The present invention relates to an electric energy storage system which comprises an electric energy storage module having a plurality of electric energy storage units connected in series, each of the plurality of electric energy storage units having one electric energy storage bank or a plurality of electric energy storage banks connected in series, and a balancing circuit connected to the electric energy storage module.

BACKGROUND

A capacitor (such as an electric double layer capacitor, a hybrid capacitor or a redox capacitor) has a characteristic that a terminal voltage largely fluctuates depending on a charged/discharged state thereof, as compared to conventional secondary batteries. Generally, an electronic device is configured such that an operating voltage thereof has a certain allowable range. However, if a supply voltage changes to a value out of the operating voltage range, the electronic device becomes operationally unstable or becomes non-operative. Therefore, in cases where a capacitor having a large voltage fluctuation is used as a power supply of an electronic device, it is necessary to keep the voltage fluctuation in the capacitor within a given range.

As means for keeping an output voltage constant, a technique is conceivable which is designed to perform voltage conversion using a DC-DC converter as illustrated in FIG. 1. However, when a DC-DC converter is operated in a wide voltage range, problems, such as a significant increase in loss, and an increase in circuit size, will occur. The problems also occur during charging to the capacitor. A charger is a sort of DC-DC converter, thus, charging is performed in a wide voltage range, loss in the charger will increase, and the size of the charger will become larger. Considering that a capacitor has an energy density which is significantly less than those of conventional secondary batteries, it is desirable to establish a voltage conversion scheme with higher efficiency as compared to a conventional DC-DC converter.

For this purpose, there has been proposed a capacitor-based power supply apparatus which comprises a capacitor module composed of a plurality of capacitors connected in series, and a plurality of taps, as illustrated in FIG. 2, wherein the apparatus is configured to change the number of ones of the series-connected capacitors which are to be connected to a load (to change the taps), to thereby reduce a fluctuation range of an output voltage thereof (the following Patent Document 1).

Patent Document 1: JP 2000-209775 A
Patent Document 2: JP 2008-219964 A

Non-Patent Document 1: K. Z. Guo, et al.: "Comparison and evaluation of charge equalization technique for series connected batteries" in Proc. IEEE PESC'06, pp. 1-6 (2006)

SUMMARY

According to a first aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a charger for charging at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a voltage across the charger; a plurality of taps led out, respectively, from one of opposite terminals of the electric energy storage module and/or one or more of a plurality of series-connection points between the electric energy storage units, through respective switches; and a switch control section for switching the switches such that one of the plurality of taps is connected to one of opposite terminals of the charger, wherein the switch control section is operable, during a charging period, to sequentially switch the switches according to progress of the charging, based on a detection result from the voltage detection section, so as to control the number of at least one of the plurality of electric energy storage units which is to be charged not via the balancing circuit but directly from the charger.

According to a second aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a charger for charging at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a voltage across the charger; a plurality of taps led out, respectively, from one of opposite terminals of the electric energy storage module and/or the other terminal of the electric energy storage module and/or one or more of a plurality of series-connection points between the electric energy storage units, through respective switches; and a switch control section for switching the switches such that one of the plurality of taps is connected to one of opposite terminals of the charger or the other terminal of the charger, wherein the switch control section is operable, during a charging period, to sequentially switch the switches according to progress of the charging, based on a detection result from the voltage detection section, so as to control the number of at least one of the plurality of electric energy storage units which is to be charged not via the balancing circuit but directly from the charger.

Preferably, in the electric energy storage system according to the second aspect of the present invention, the switch control section is operable, after switching the switches predetermined times, with respect to each of a plurality of groups set by grouping the plurality of electric energy storage units, to subsequently sequentially switch the switches according to progress of the charging, based on a detection result from the voltage detection section and in a time division manner, so as to control the number of at least one of the plurality of electric energy storage units which is to be charged not via the balancing circuit but directly from the charger.

Preferably, in the electric energy storage system according to the second aspect of the present invention, the switch control section is operable, with respect to each of a plurality of groups set by grouping the plurality of electric energy storage units, to sequentially switch the switches according to progress of the charging, based on a detection result from the voltage detection section and in a time division manner, so as to control the number of at least one of the plurality of electric energy storage units which is to be charged not via the balancing circuit but directly from the charger.

More preferably, the switch control section is further operable to perform one or more times, after switching the switches predetermined times, with respect to each of groups set by re-grouping the plurality of electric energy storage units such that the number of the group set by the re-grouping is greater than the number of the group after switching the switches predetermined times, at least one subsequent sequential switching of the switch according to progress of the charging, based on a detection result from the voltage detection section and in a time division manner, so as to control the number of at least one of the plurality of electric energy storage units which is to be charged not via the balancing circuit but directly from the charger.

According to a third aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a load to which electric energy is to be supplied from at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a discharging voltage from the electric energy storage banks to the load; a plurality of taps led out, respectively, from one of opposite terminals of the electric energy storage module and/or one or more of a plurality of series-connection points between the electric energy storage units, through respective switches; and a switch control section for switching the switches such that one of the plurality of taps is connected to one of opposite terminals of the load, wherein the switch control section is operable, during a discharging period, to sequentially switch the switches according to the discharged state, based on a detection result from the voltage detection section, so as to control the number of at least one of the plurality of electric energy storage units which is to be discharged from at least one of the electric energy storage units not via the balancing circuit but directly to the load.

According to a fourth aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a load to which electric energy is to be supplied from at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a discharging voltage from the electric energy storage banks to the load; a plurality of taps led out, respectively, from one of opposite terminals of the electric energy storage module and/or the other terminal of the electric energy storage module and/or one or more of a plurality of series-connection points between the electric energy storage units, through respective switches; and a switch control section for switching the switches such that one of the plurality of taps is connected to one of opposite terminals of the load or the other terminal of the load, wherein the switch control section is operable, during a discharging period, to sequentially switch the switches according to the discharged state, based on a detection result from the voltage detection section, so as to control the number of at least one of the plurality of electric energy storage units which is to be discharged from at least one of the electric energy storage units not via the balancing circuit but directly to the load.

Preferably, in the electric energy storage system according to the fourth aspect of the present invention, the switch control section is operable, with respect to each of a plurality of groups set by grouping the plurality of electric energy storage units, to sequentially switch the switches according to the discharged state, based on a detection result from the voltage detection section and in a time division manner, so as to control the number of at least one of the plurality of electric energy storage units which is to be discharged from at least one of the electric energy storage units not via the balancing circuit but directly to the load.

More preferably, the switch control section is further operable to perform one or more times, after switching the switches predetermined times, with respect to each of at least one group set by re-grouping the plurality of electric energy storage units such that the number of the at least one group set by the re-grouping is less than the number of the groups after switching the switches predetermined times, at least one subsequent sequential switching of the switches according to the discharged state, based on a detection result from the voltage detection section and in a time division manner, so as to control the number of at least one of the plurality of electric energy storage units which is to be discharged from at least one of the electric energy storage units not via the balancing circuit but directly to the load.

According to a fifth aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a charger for charging at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a voltage across the charger; a plurality of taps led out, respectively, from one of opposite terminals of the electric energy storage module and/or one or more of a plurality of series-connection points between the electric energy storage units, through respective switches; and a switch control section for switching the switches such that one of the plurality of taps is connected to one of opposite terminals of the charger, wherein the switch control section is operable, during a charging period, to switch the switches at least once, based on a detection result from the voltage detection section, so as to reduce the number of at least one of the plurality of electric energy storage units which is to be charged not via the balancing circuit but directly from the charger.

According to a sixth aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a charger for charging at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a voltage across the charger; a plurality of taps led out, respectively, from one of opposite terminals of the electric energy storage module and/or the other terminal of the electric energy storage module and/or one or more of a plurality of series-connection points between the electric energy storage units, through respective switches; and a switch control section for switching the switches such that one of the plurality of taps is connected to one of opposite terminals of the charger or the other terminal of the charger, wherein the switch control section is operable, during a charging period, to switch the switches at least once, based on a detection result from the voltage detection section, so as to reduce the number of at least one of the plurality of electric energy storage units which is to be charged not via the balancing circuit but directly from the charger.

Preferably, in the electric energy storage system according to the sixth aspect of the present invention, the switch control section is operable, after switching the switches predetermined times, with respect to each of a plurality of groups set by grouping the plurality of electric energy storage units, to sequentially switch the switches at least once, based on a detection result from the voltage detection section and in a time division manner, so as to reduce the number of at least one of the plurality of electric energy storage units which is to be charged not via the balancing circuit but directly from the charger.

Preferably, in the electric energy storage system according to the sixth aspect of the present invention, the switch control section is operable, with respect to each of a plurality of groups set by grouping the plurality of electric energy storage units, to switch the switches at least once, based on a detection result from the voltage detection section and in a time division manner, so as to reduce the number of at least one of the plurality of electric energy storage units which is to be charged not via the balancing circuit but directly from the charger.

More preferably, the switch control section is further operable to perform one or more times, after switching the switches predetermined times, with respect to each of groups set by re-grouping the plurality of electric energy storage units such that the number of the group set by the re-grouping is greater than the number of the group after switching the switches predetermined times, subsequent switching of the switches at least one time, based on a detection result from the voltage detection section and in a time division manner, so as to reduce the number of at least one of the plurality of electric energy storage units which is to be charged not via the balancing circuit but directly from the charger.

According to a seventh aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a load to which electric energy is to be supplied from at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a discharging voltage from the electric energy storage banks to the load; a plurality of taps led out, respectively, from one of opposite terminals of the electric energy storage module and/or one or more of a plurality of series-connection points between the electric energy storage units, through respective switches; and a switch control section for switching the switches such that one of the plurality of taps is connected to one of opposite terminals of the load, wherein the switch control section is operable, during a discharging period, to switch the switches at least once, based on a detection result from the voltage detection section, so as to increase the number of at least one of the plurality of electric energy storage units which is to be discharged from at least one of the electric energy storage units not via the balancing circuit but directly to the load.

According to an eighth aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a load to which electric energy is to be supplied from at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a discharging voltage from the electric energy storage banks to the load; a plurality of taps led out, respectively, from one of opposite terminals of the electric energy storage module and/or the other terminal of the electric energy storage module and/or one or more of a plurality of series-connection points between the electric energy storage units, through respective switches; and a switch control section for switching the switches such that one of the plurality of taps is connected to one of opposite terminals of the load or the other terminal of the load, wherein the switch control section is operable, during a discharging period, to switch the switches at least once, based on a detection result from the voltage detection section, so as to increase the number of at least one of the plurality of electric energy storage units which is to be discharged from at least one of the electric energy storage units not via the balancing circuit but directly to the load.

Preferably, in the electric energy storage system according to the eighth aspect of the present invention, the switch control section is operable, with respect to each of a plurality of groups set by grouping the plurality of electric energy storage units, to switch the switches at least once, based on a detection result from the voltage detection section and in a time division manner, so as to increase the number of at least one of the plurality of electric energy storage units which is to be discharged from at least one of the electric energy storage units not via the balancing circuit but directly to the load without involving the balancing circuit.

More preferably, the switch control section is further operable to perform one or more times, after switching the switches predetermined times, with respect to each of groups set by re-grouping the plurality of electric energy storage units such that the number of the group set by the re-grouping is greater than the number of the group after switching the switches predetermined times, subsequent switching of the switches at least one time, based on a detection result from the voltage detection section and in a time division manner, so as to increase the number of at least one of the plurality of electric energy storage units which is to be discharged from at least one of the electric energy storage units not via the balancing circuit but directly to the load.

According to a ninth aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a charger for charging at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a voltage across the charger; a plurality of taps led out, respectively, from one of opposite terminals of the electric energy storage module and/or the other terminal of the electric energy storage module and/or one or more of a plurality of series-connection points between the electric energy storage units, through respective switches; and a switch control section for switching the switches such that one of the plurality of taps is connected to one of opposite terminals of the charger or the other terminal of the charger, wherein the switch control section is operable, with respect to each of a plurality of groups set by grouping the plurality of electric energy storage units, to sequentially switch the switches so as to repeatedly charge the same at least one electric energy storage unit not via the balancing circuit but directly from the charger, in a time division manner.

According to a tenth aspect of the present invention, there is provided an electric energy storage system which comprises: an electric energy storage module having a plurality of electric energy storage units connected in series, each of the plurality of electric energy storage units having one electric energy storage bank or a plurality of electric energy storage banks connected in series; a load to which electric energy is to be supplied from at least one of the electric energy storage banks; a balancing circuit connected to the electric energy storage module to correct a variation in charged/discharged state between the electric energy storage banks; a voltage detection section for detecting a voltage across or across each of one or more of the electric energy storage banks, or a discharging voltage from the electric energy storage banks to the load; a plurality of taps led out, respectively, from one of opposite terminals of the electric energy storage module and/or the other terminal of the electric energy storage module and/or one or more of a plurality of series-connection points between the electric energy storage units, through respective switches; and a switch control section for switching the switches such that one of the plurality of taps is connected to one of opposite terminals of the load or the other terminal of the load, wherein the switch control section is operable, with respect to each of a plurality of groups set by grouping the plurality of electric energy storage units, to sequentially switch the switches so as to repeatedly discharge the same at least one electric energy storage unit not via the balancing circuit but directly to the load, in a time division manner.

BRIEF DESCRIPTION OF THE DRAWINGS

FIG. 14A is a graph illustrating an example of charging waveforms of a part of a plurality of capacitor banks when a capacitor module is charged using a balancing circuit limited in equalization capability, in the electric energy storage system according to the fourth embodiment.

FIG. 14B is a graph illustrating an example of charging waveforms of a part of a plurality of capacitor banks when the capacitor module is charged using a balancing circuit limited in equalization capability, in the electric energy storage system according to the fourth embodiment.

DETAILED DESCRIPTION

Figure 1:
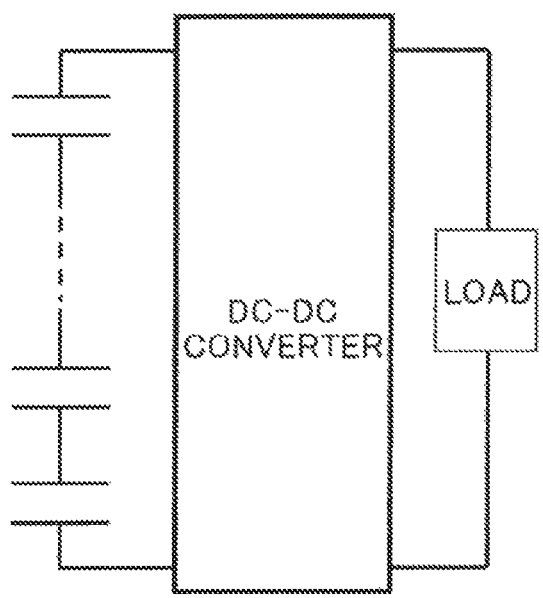
FIG. 1 is a circuit diagram illustrating a conventional capacitor-based power supply apparatus.
Figure 2:
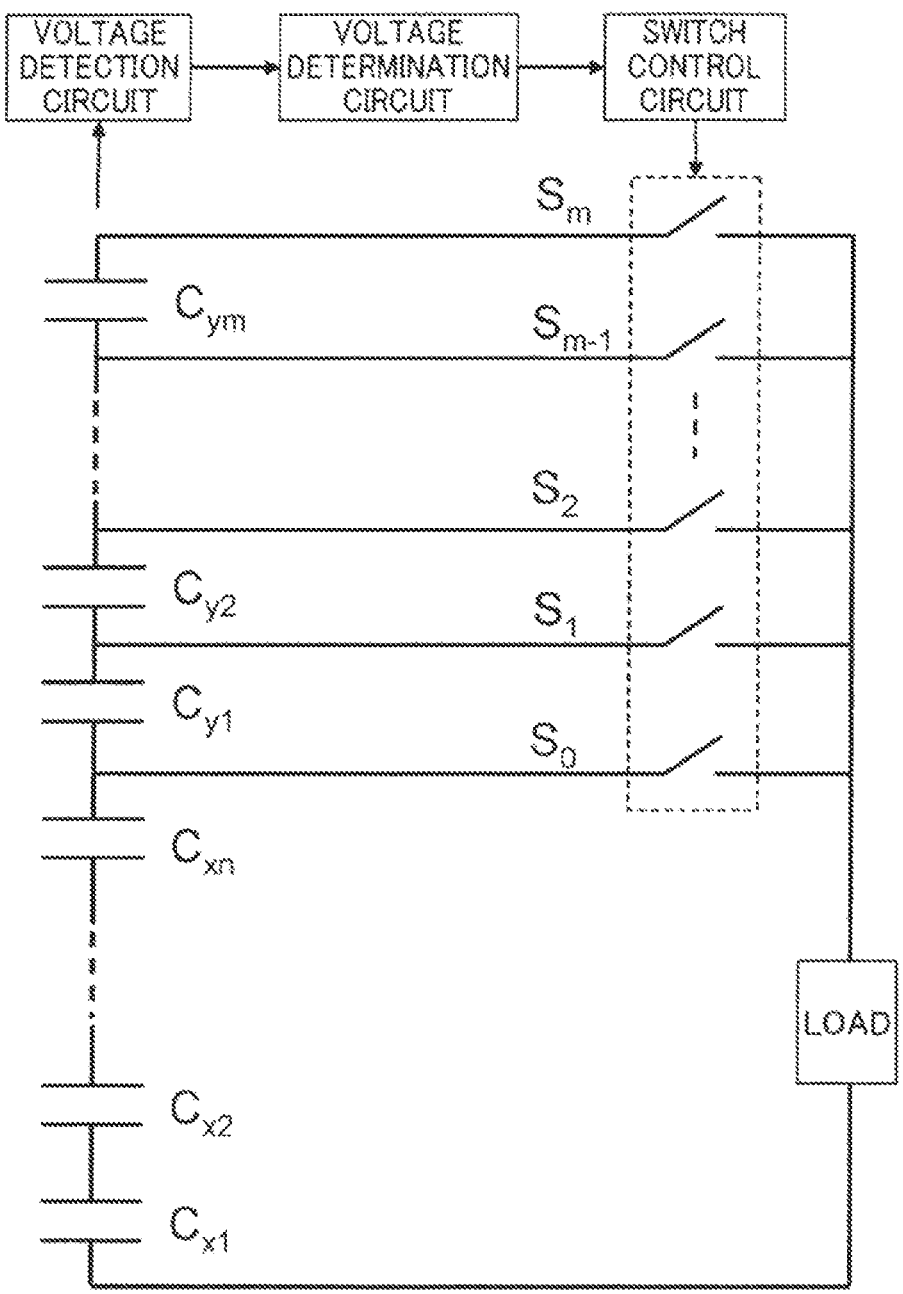
FIG. 2 is a circuit diagram illustrating a conventional capacitor-based power supply apparatus.
Figure 3:
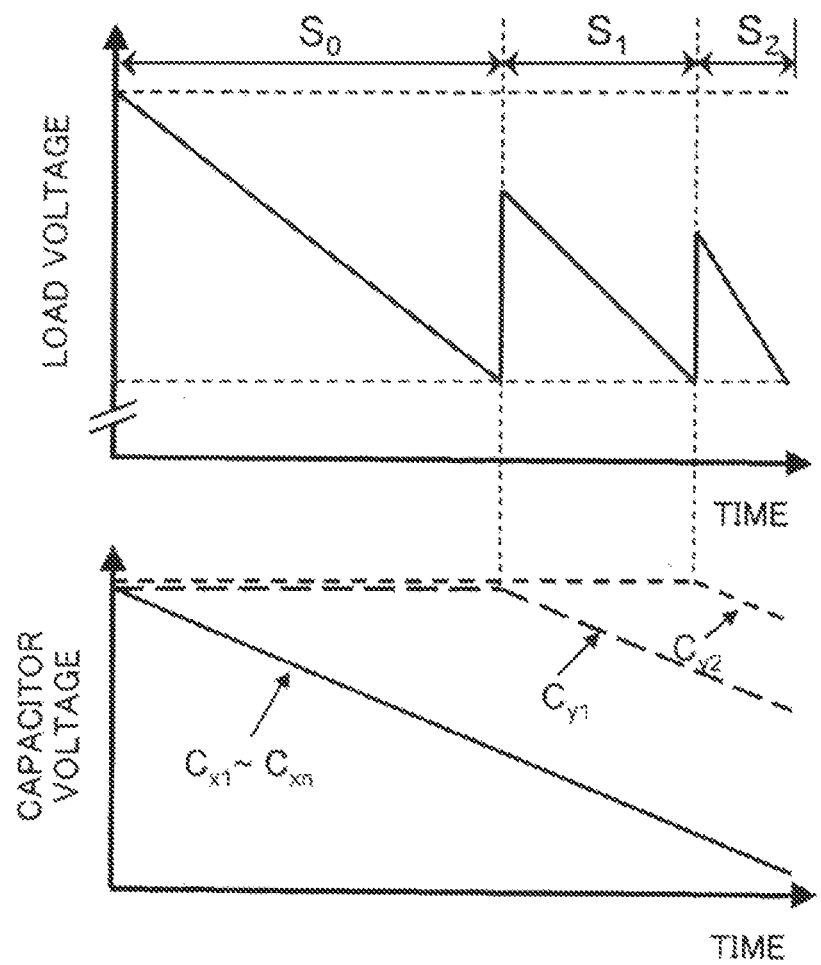
FIG. 3 is graphs illustrating an output voltage (upper graph) and capacitor voltage curves (lower graph) obtained when a capacitor module is discharged using the capacitor-based power supply apparatus illustrated in FIG. 2.

FIG. 3 illustrates an output voltage (upper graph) and capacitor voltage curves (lower graph) obtained when the capacitor module is discharged using the above apparatus. As illustrated in FIG. 3, when the number of ones of the series-connected capacitors which are to be connected to the load, is changed, a period of time for which a capacitor is to be connected to the load is also changed, so that a variation in charged/discharged state occurs between the capacitors, which causes a problem that energy of a part (in FIG. 2, $C_{y1}$ to $C_{ym}$) of the capacitors cannot be effectively utilized. The above problem can be solved by employing a technique of setting different capacitance values for each of a plurality of capacitors so as to allow voltages across the respective capacitors to become equal to each other at the end of the discharging. In this case, however, it is necessary to prepare a plurality of types of capacitors having different capacitance values.

In view of the above circumstances, in an electric energy storage system which comprises an electric energy storage module having a plurality of electric energy storage units connected in series, each of the plurality of electric energy storage units having one electric energy storage bank or a plurality of electric energy storage banks connected in series, and a balancing circuit connected to the electric energy storage module, it is an object of the present invention to provide a technique of equally utilizing the electric energy storage banks during charging/discharging. It is an object of the present invention to keep fluctuation of an input voltage from a charger or an output voltage to a load, within an arbitrary range, while equally utilizing the electric energy storage banks during charging/discharging.

The electric energy storage system of the present invention can efficiently perform voltage equalization between the electric energy storage banks, even in cases where the balancing circuit needs time to correct a variation in charged/discharged state by itself, due to influences of an internal resistance of each of the electric energy storage banks, characteristics of the balancing circuit, etc.

In addition, the electric energy storage system of the present invention can keep a charging voltage from the charger or a discharging voltage to the load within an arbitrary range without using a DC-DC converter, etc., while equally maintaining voltages across the respective electric energy storage banks, by adequately selecting the taps connected to the charger or load, according to a voltage value of or of each of the electric energy storage banks or a voltage value in the charger.

With reference to the drawings, some embodiments of the present invention will now be described. In the following description, the term "capacitor bank" means a bank composed of a single capacitor cell or a plurality of capacitor cells connected in series, in parallel or in series-parallel. The term "capacitor unit" means a unit composed of a single capacitor bank, or a plurality of capacitor banks connected in series. The term "capacitor module" means a module composed of a plurality of capacitor units connected in series. Further, the term "electric energy storage cell" means a capacitor, a secondary battery or the like. The term "electric energy storage bank" means a bank composed of a single electric energy storage cell or a plurality of electric energy storage cells connected in series, in parallel or in series-parallel. The term "electric energy storage unit" means a unit composed of a single electric energy storage bank, or a plurality of electric energy storage banks connected in series. The term "electric energy storage module" means a module composed of a plurality of electric energy storage units connected in series.

FIRST EXAMPLE

Figure 4:
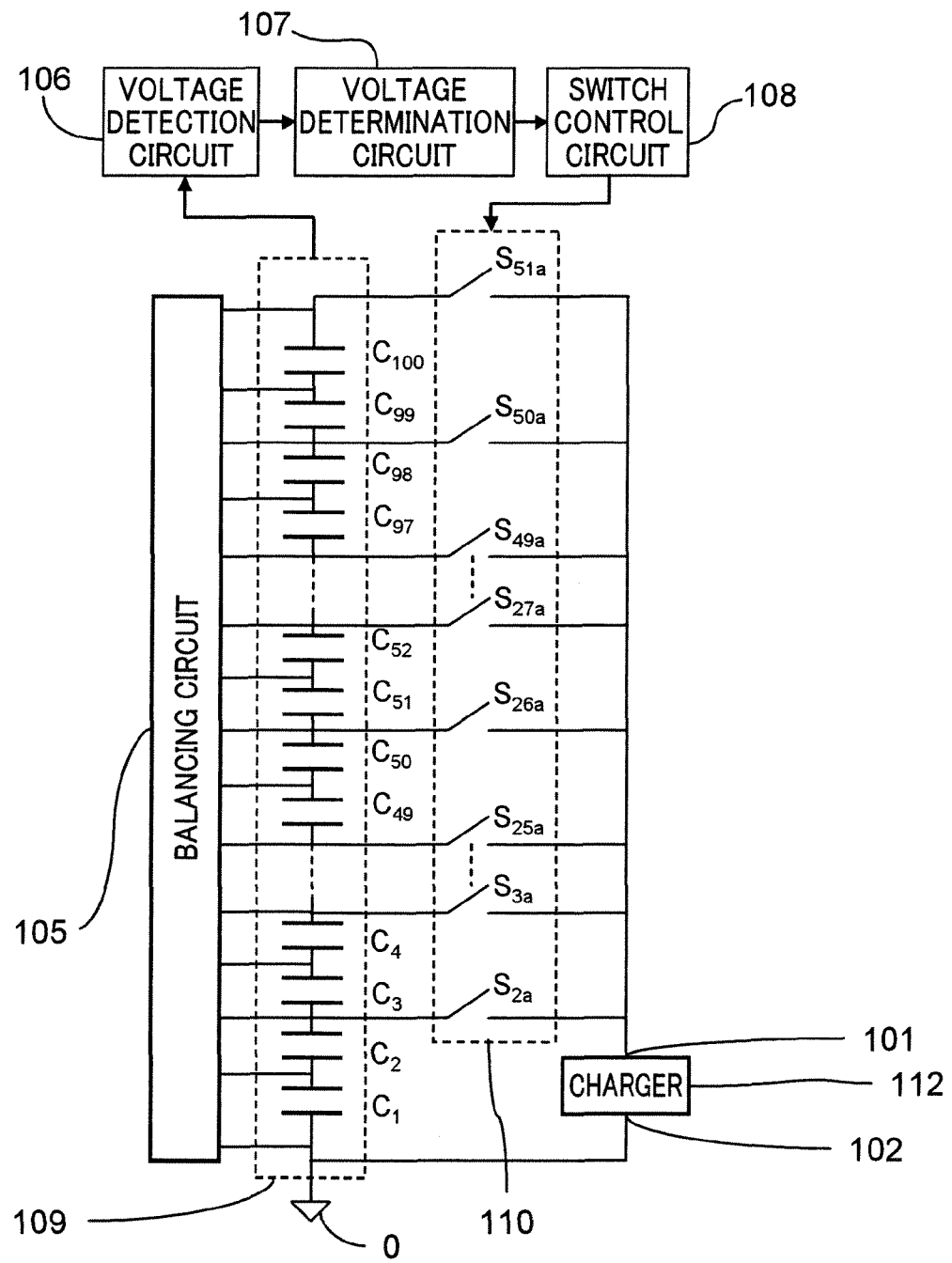
FIG. 4 is a circuit diagram illustrating an electric energy storage system according to a first embodiment of the present invention.

FIG. 4 is a circuit diagram illustrating an electric energy storage system according to a first embodiment of the present invention. The first embodiment will be described based on an example where in a capacitor module 109 composed of m series-connected capacitor banks each having a rated voltage Vc, n taps are provided, respectively, for capacitor units each composed of h of the capacitor banks, and the capacitor module including a balancing circuit 105 is subjected to full charging at a voltage Vin using a charger 112 (an inter-terminal voltage of the capacitor module=Vc×m), where: m=100; n=51; and h=2.

The balancing circuit is a circuit for correcting a variation in charged/discharged state between a plurality of electric energy storage banks making up an electric energy storage module, and is operable to perform energy transfer between the electric energy storage banks, i.e., a balancing operation, during both a charging period and a discharging period. The balancing circuit may be roughly classified into a type using a capacitor, a type using a coil and a type using a transformer. Various specific circuits of each of the three types are known (see, for example, the Patent Document 2 and the Non-Patent Document 1).

Returning to FIG. 4, switches $S_{2a}$ to $S_{51a}$ make up a switch group 110, and each of the switches $S_{2a}$ to $S_{51a}$ is connected between a corresponding one of the taps led out from respective ones of a plurality of series-connection points between the capacitor units, and a high-potential side terminal 101 of the charger 112. $C_1$ to $C_{100}$ indicate the respective capacitor banks. One of the switches $S_{2a}$ to $S_{51a}$ is turned on and directly connected to the high-potential side terminal 101 of the charger 112. A low-potential side terminal 102 of the charger is fixedly connected to the ground 0 of the capacitor module. A voltage detection circuit 106 is operable to detect a voltage across or across each of all or a part of the capacitor banks making up the capacitor module 109. A voltage determination circuit 107 is operable to compare the voltage detection result with a reference voltage, and then a switch control circuit 108 is operable, based on a result of the comparison, to switch the switches to control a charging voltage from the charger to fall within an arbitrary range, e.g., within an allowable voltage fluctuation range of the charger.

Figure 5:
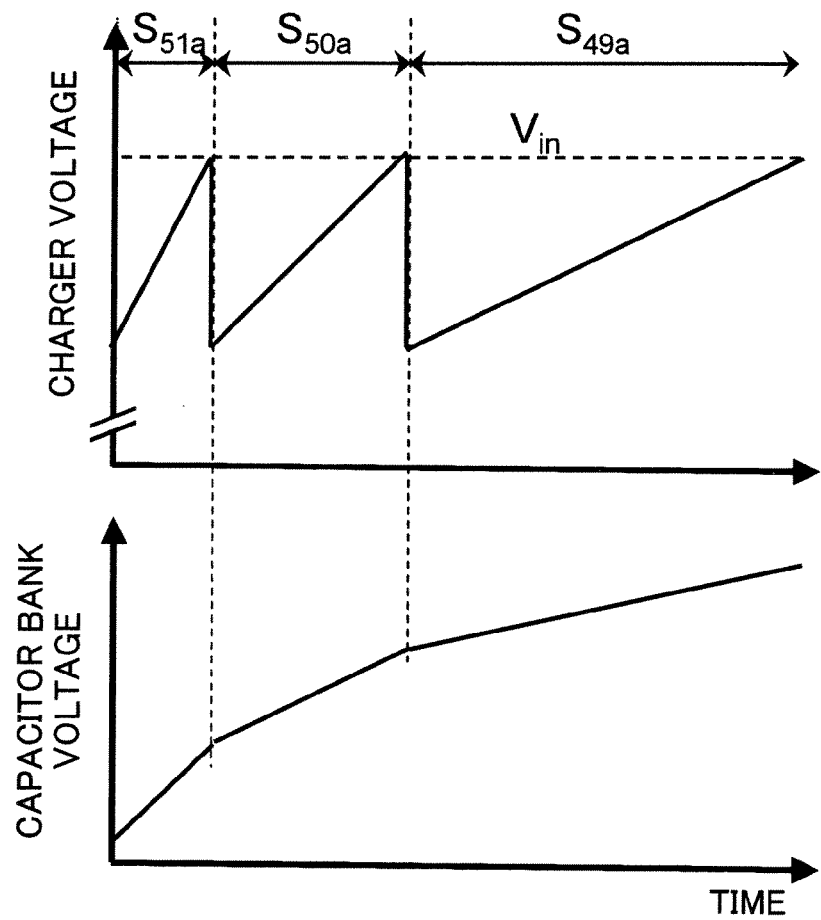
FIG. 5 is graphs illustrating a charger voltage (upper graph) and a capacitor bank charging curve (lower graph) obtained when the electric energy storage system according to the first embodiment is charged.

FIG. 5 illustrates a charger voltage (upper graph) and a capacitor bank charging curve (lower graph) when a charging is performed in the system illustrated in FIG. 4. The following description will be made on the assumption that an operation of the balancing circuit is ideal, i.e., voltages across the respective capacitor banks making up the capacitor module are evenly maintained by the balancing circuit under any conditions.

When the switch control circuit 108 operates to turn on the switch $S_{51a}$, ones of the capacitor units on a low potential side of the tap connected to the switch $S_{51a}$, i.e., all of the capacitor banks, are directly charged from the charger.

As the charging progresses, the voltage across each of the capacitor banks will be gradually increased, and the charger voltage will reach Vin. Given that the voltages across the respective capacitor banks at this timing are equal to each other, the voltage across each of the capacitor banks is Vin/100. When the voltage determination circuit 107 determines, based on a voltage detection result from the voltage detection circuit 106, that the charger voltage reaches Vin, the switch control circuit 108 operates to turn off the switch $S_{51a}$ and simultaneously turn on the switch $S_{50a}$, so that the tap for connecting the charger 112 and the capacitor module 109 is shifted toward the low potential side by one. This leads the charger voltage to be lowered by a value corresponding to a voltage across the capacitor banks $C_{100}$ and $C_{99}$, i.e., (2×Vin)/100. In this state, electric energy from the charger is supplied to ones of the capacitor units on a low potential side of the tap connected to the switch $S_{50a}$, i.e., the capacitor banks $C_1$ to $C_{98}$, are directly charged from the charger. Further, the capacitor banks $C_{100}$ and $C_{99}$ are charged by receiving electric charges from the capacitor banks $C_1$ to $C_{98}$ via the balancing circuit.

When the charging further progresses, and the voltage determination circuit 107 determines, based on a voltage detection result from the voltage detection circuit 106, that the charger voltage reaches Vin again, the switch control circuit 108 operates to turn off the switch $S_{50a}$ and simultaneously turn on the switch $S_{49a}$, so that the tap for connecting the charger 112 and the capacitor module 109 is additionally shifted toward the low potential side by one. This leads the charger voltage to be lowered by a value corresponding to a voltage across the capacitor banks $C_{98}$ and $C_{97}$, i.e., (2×Vin)/98. In this state, ones of the capacitor units on the low potential side of the tap connected to the switch $S_{49a}$, i.e., the capacitor banks $C_1$ to $C_{96}$, are directly charged from the charger. Further, the capacitor banks $C_{97}$ to $C_{100}$ are charged by receiving electric charges from the capacitor banks $C_1$ to $C_{98}$ via the balancing circuit.

Subsequently, in the same manner, the switches $S_{49a}$ to $S_{2a}$ are sequentially switched, according to the charger voltage so that the respective capacitor banks can be equally charged, while keeping the charger voltage within a certain arbitrary range.

The above operation will be repeated until a total value of the rated voltages of the capacitor banks to be directly charged by the charger becomes less than the charging voltage by the charger. In other words, the above grouped charging will be repeated until the following relation is satisfied: x×Vc<Vin, where x is the number of series-connected ones of the capacitor banks which are to be directly charged by the charger. Based on repeating the above operation, it becomes possible to more equally perform the charging to each of the capacitor banks and thus shorten a charging time.

SECOND EXAMPLE

Figure 6:
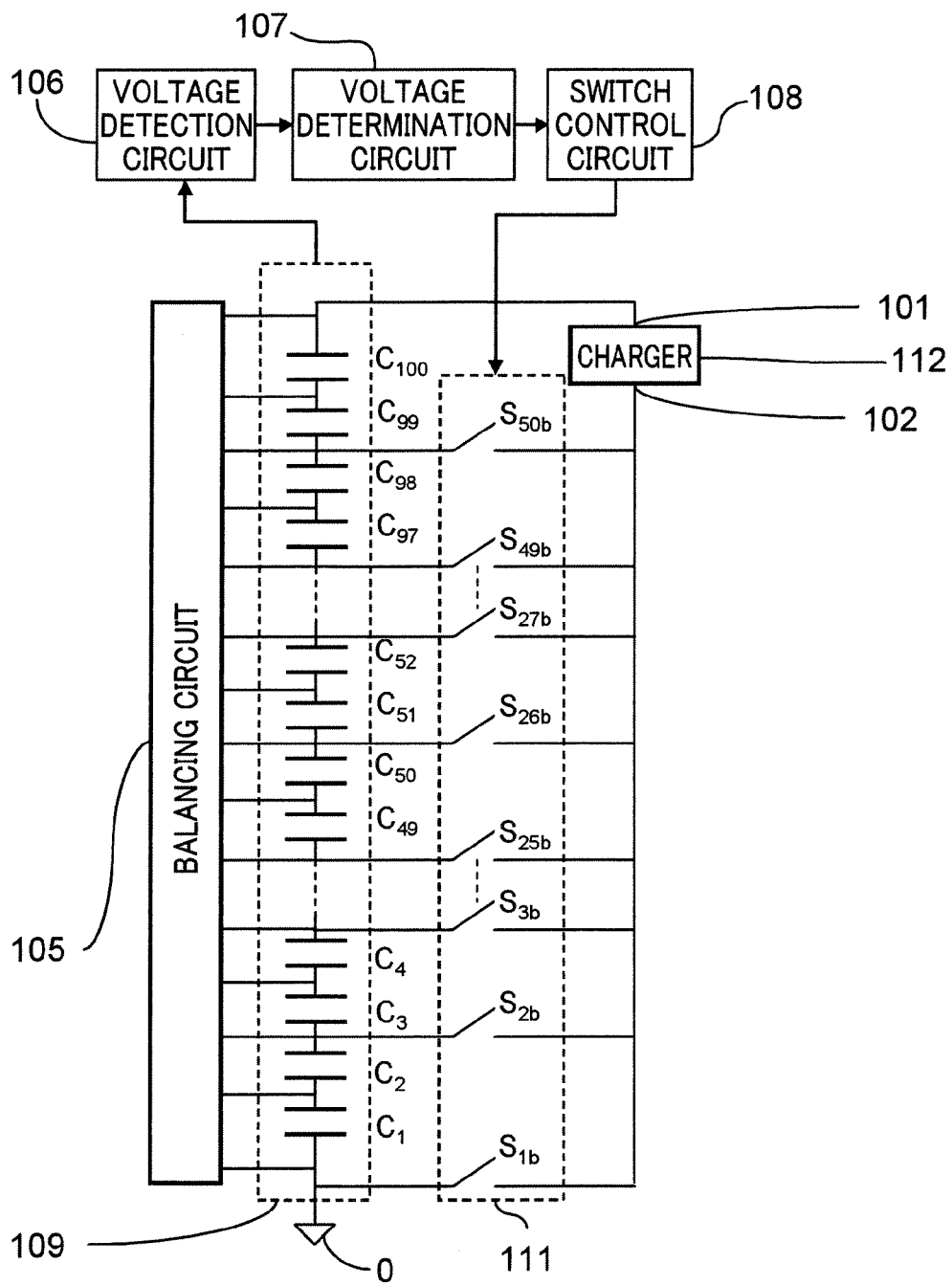
FIG. 6 is a circuit diagram illustrating an electric energy storage system according to a second embodiment of the present invention.

FIG. 6 is a circuit diagram illustrating an electric energy storage system according to a second embodiment of the present invention. In FIG. 6, an element or component corresponding to that in FIG. 4 is defined by a common reference numeral or code, and duplicate description of the same element or component as that in the first embodiment will be omitted.

The first embodiment is configured such that the high-potential side terminal 101 of the charger 112 is connected to the taps led out from the capacitor module 109, via the switch group 110. Differently, in the second embodiment, a switch group 111 composed of switches $S_{1b}$ to $S_{50b}$ is provided between the low-potential side terminal 102 of the charger 112 and the capacitor module 109. In the second embodiment, the switch control circuit 108 is operable, based on a voltage detection result from the voltage detection circuit 106, to sequentially switch the switches in order of $S_{1b}$, $S_{2b}$, ..., $S_{50b}$.

The above embodiments have been described on the assumption that the operation of the balancing circuit is ideal, i.e., voltages across the respective capacitor banks making up the capacitor module are evenly maintained by the balancing circuit, under any conditions. In reality, however, characteristics of the balancing circuit are not ideal. Thus, a voltage variation between the capacitor banks will occur due to a limitation in equalization capability of the balancing circuit, a presence of an equivalent series resistance in the capacitor banks, etc.

Figure 7:
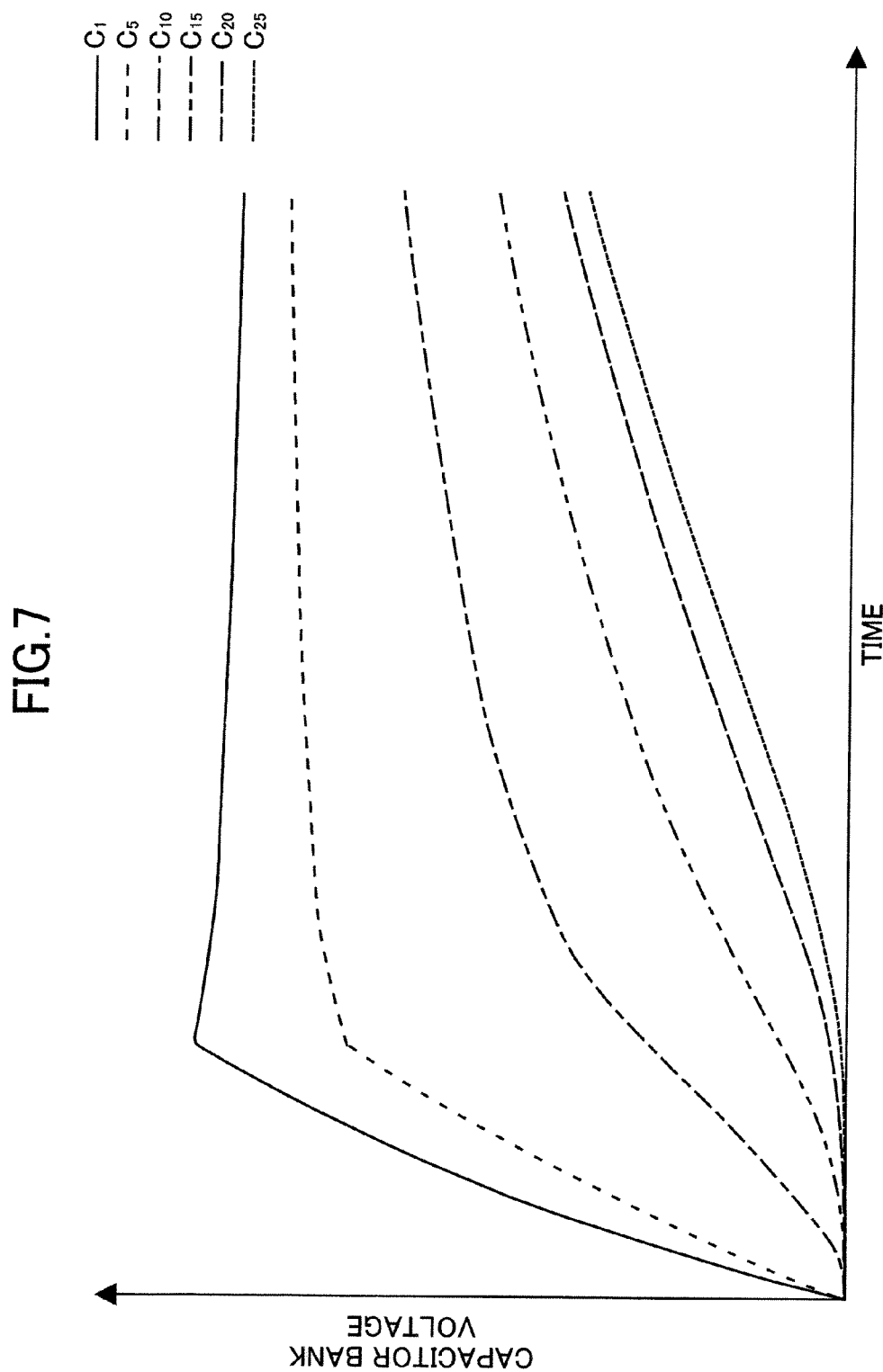
FIG. 7 is a graph illustrating one example of charging waveforms of a part of a plurality of capacitor banks when a capacitor module is charged using a balancing circuit limited in equalization capability, in the electric energy storage system according to the first embodiment.

FIG. 7 relates to a system based on the basic configuration of the first embodiment discussed in FIG. 4 (wherein: m=25; n=26; h=1; and a capacitance of each of two capacitor banks $C_1$ and $C_{25}$ is set to be two times that of each of the remaining capacitor banks), including a capacitor module that was charged via a switch $S_{5a}$ connected to a series-connection point between two capacitor banks $C_5$ and $C_6$, using a balancing circuit limited in equalization capability. FIG. 7 illustrates one example of charging waveforms of a part ($C_1$, $C_5$, $C_{10}$, $C_{15}$, $C_{20}$ and $C_{25}$) of the capacitor banks FIG. 7 shows that the capacitor banks are not equally charged in the charging process. A part ($C_6$ to $C_{25}$ on a high potential side with respect to the switch $S_{5a}$) of the capacitor banks which are not directly charged from a charger are charged by receiving electric charges from the directly charged capacitor banks (capacitor banks $C_1$ to $C_5$ on a low potential side with respect to the switch $S_{5a}$) via the balancing circuit. However, due to insufficiency of a transfer speed of electric charges from the low potential side to the high potential side by the balancing circuit, a voltage across each of the capacitor banks on the high potential side is apt to become less than that across each of the capacitor banks on the low potential side. Moreover, as the capacitor bank is located at a position electrically farther from the charger, progress of the charging becomes slower. Although voltages across the respective capacitor banks will fall within a given range over time by the function of the balancing circuit, it is necessary to take a long time until the voltages across the respective capacitor banks are sufficiently equalized. Moreover, a charging voltage overshoot phenomenon (overcharge) is observed in a part ($C_1$) of the capacitor banks.

THIRD EXAMPLE

Figure 8:
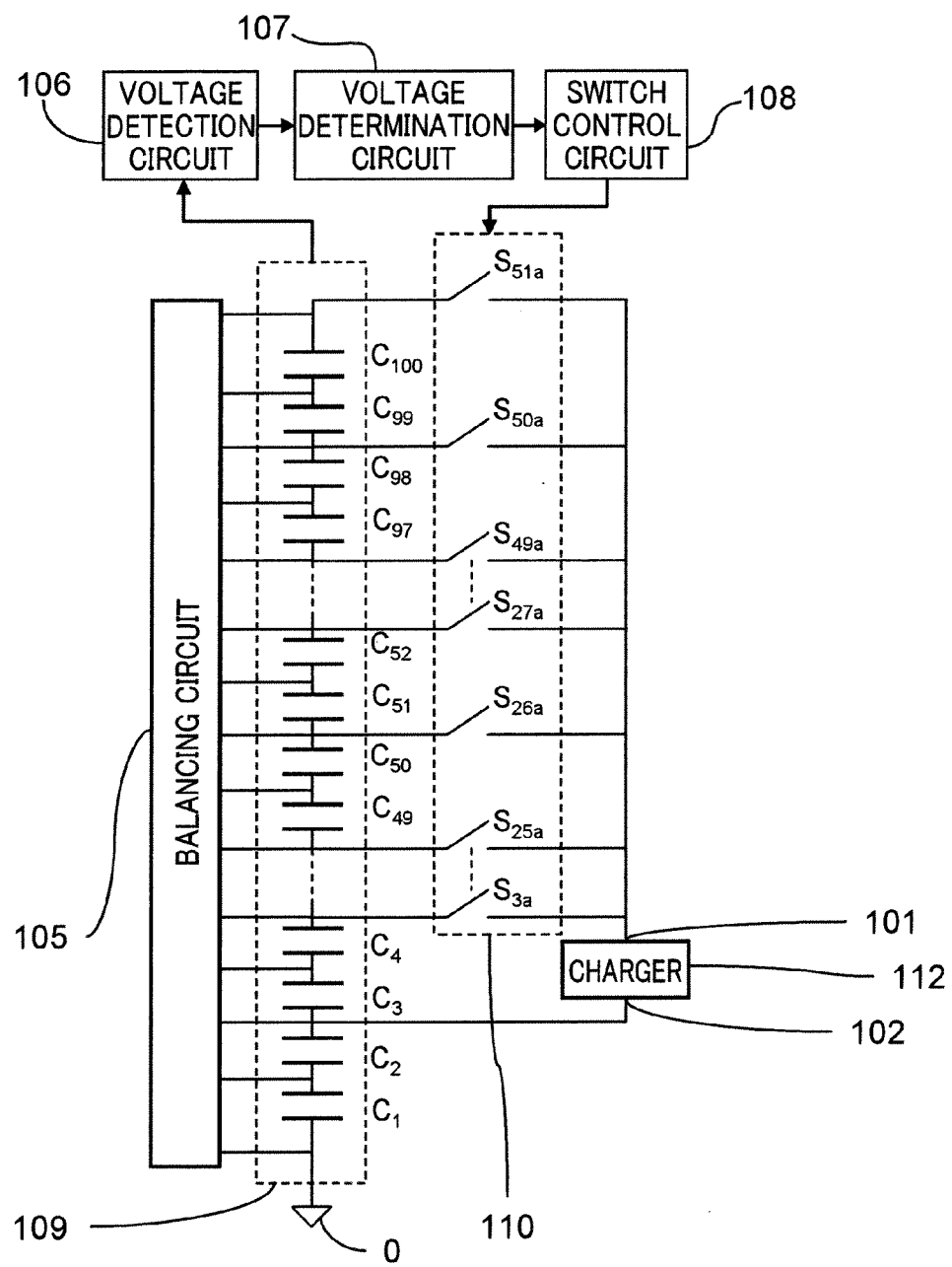
FIG. 8 is a circuit diagram illustrating an electric energy storage system according to a third embodiment of the present invention.

FIG. 8 is a circuit diagram illustrating an electric energy storage system according to a third embodiment of the present invention. In FIG. 8, an element or component corresponding to that in FIG. 4 is defined by a common reference numeral or code, and duplicate description of the same element or component as that in the first embodiment will be omitted.

The first embodiment is configured such that the low-potential side terminal 102 of the charger is directly connected to the ground 0 of the capacitor module 109. Differently, in the third embodiment, the low-potential side terminal 102 is fixedly connected to the series-connection point between the capacitor banks $C_2$ and $C_3$, instead of being directly connected to the ground 0 of the capacitor module 109.

In the third embodiment, the switch control circuit 108 is operable, based on a voltage detection result from the voltage detection circuit 106, to sequentially switch switches in order of $S_{51a}, S_{50a}, \ldots, S_{3a}$.

In a last phase of the charging process in the system according to the first embodiment, the switch $S_{2a}$ is turned on, so that the two capacitor banks $C_1$ and $C_2$ are directly charged, and the remaining capacitor banks are charged via the balancing circuit. In this phase, the capacitor bank $C_{100}$ is located electrically farthest from the charger 112 (by a distance corresponding to ninety-eight capacitor banks), so that, when characteristics of the balancing circuit are not ideal, the capacitor bank $C_{100}$ exhibits the lowest voltage in the charging process.

Differently from the first embodiment configured such that the low-potential side terminal 102 of the charger 112 is connected to the ground 0 of the capacitor module 109, in the third embodiment configured such that the low-potential side terminal of the charger is not directly connected to the ground terminal of the capacitor module, an electrical distance between the charger and the capacitor bank in the last phase of the charging can be shortened as compared to the system according to the first embodiment.

In the third embodiment, the low-potential side terminal 102 of the charger is fixedly connected to the series-connection point between the capacitor banks $C_2$ and $C_3$, so that the capacitor banks $C_1$ and $C_2$ cannot be directly charged by the charger 112. However, the capacitor banks $C_1$ and $C_2$ are charged by receiving electric charges from the remaining capacitor banks via the balancing circuit 105.

In the last phase of the charging process in the third embodiment, the switch $S_{3a}$ is turned on, so that the capacitor banks $C_3$ and $C_4$ are directly charged, and the remaining capacitor banks are charged via the balancing circuit. In the system illustrated in FIG. 4 according to the first embodiment, the capacitor bank $C_{100}$ located electrically farthest from the charger 112 is away from the charger by a distance corresponding to ninety-eight capacitor banks, whereas, in the system according to the third embodiment, the low-potential side terminal 102 of the charger 112 is connected to a position (the series-connection point between the capacitor banks $C_2$ and $C_3$) of higher potential side by a distance corresponding to two capacitor banks. Thus, the capacitor bank $C_{100}$ is away from the charger by a distance corresponding to ninety-six capacitor banks, i.e., closer to the charger by a distance corresponding to two capacitor banks, as compared to the system illustrated in FIG. 4 according to the first embodiment. This makes it possible to suppress a voltage variation between the capacitor banks in the last phase of the charging process at a lower level, as compared to the system illustrated in FIG. 4 according to the first embodiment.

In order to minimize a voltage variation between the capacitor banks in the last phase of the charging process in the system according to the third embodiment, the high-potential side terminal 101 and the low-potential side terminal 102 of the charger 112 may be connected, respectively, to the switches $S_{27a}$ and $S_{26a}$, or the switches $S_{26a}$ and $S_{25a}$.

It is to be understood that a layout, such as a position and the number of the switches, in the third embodiment, may be appropriately changed or modified, as needed.

FOURTH EXAMPLE

Figure 9:
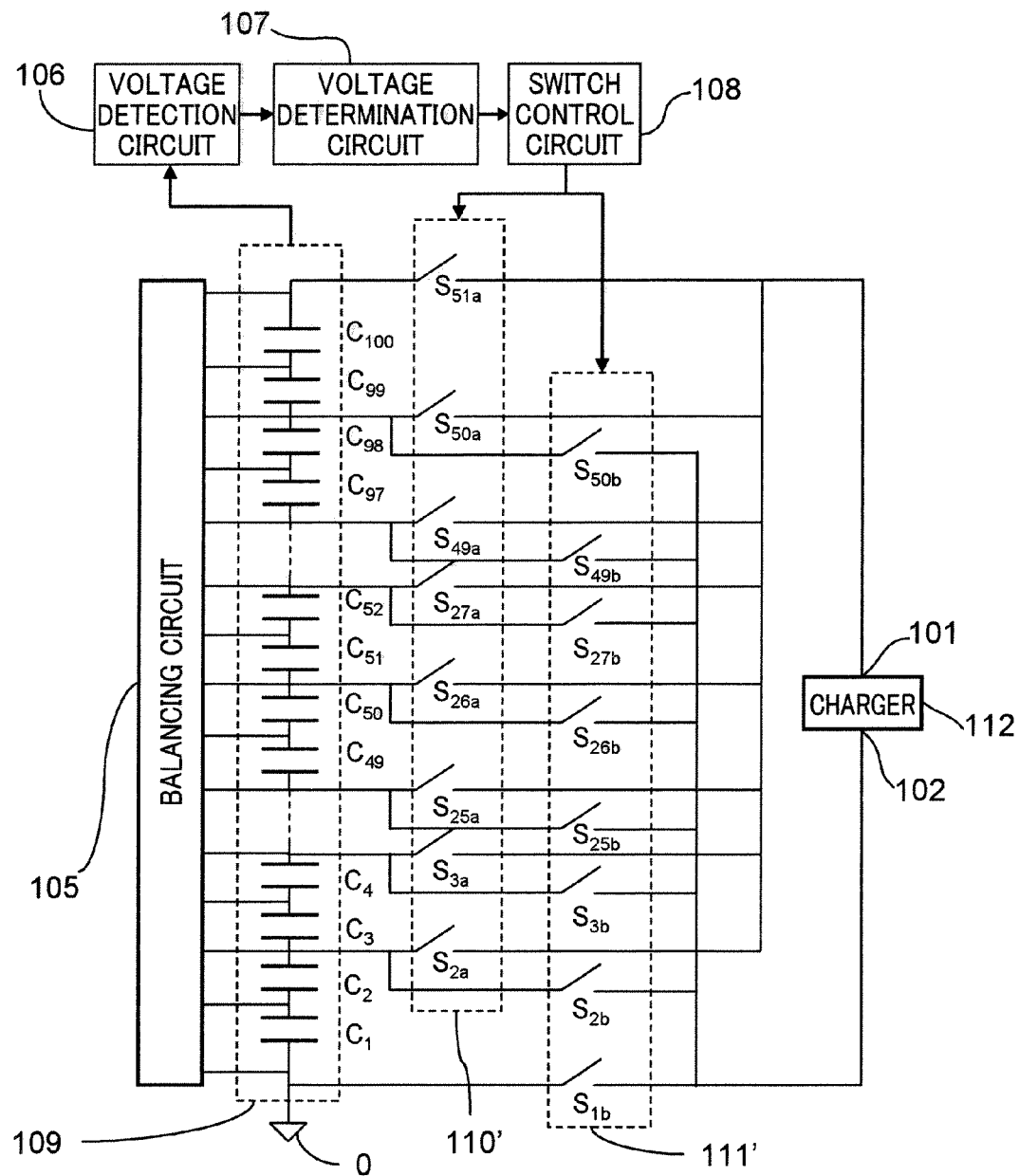
FIG. 9 is a circuit diagram illustrating an electric energy storage system according to a fourth embodiment of the present invention.

FIG. 9 is a circuit diagram illustrating an electric energy storage system according to a fourth embodiment of the present invention. In FIG. 9, an element or component corresponding to that in FIG. 4 is defined by a common reference numeral or code, and duplicate description of the same element or component as that in the first embodiment will be omitted.

As mentioned above, in order to minimize a voltage variation between the capacitor banks in the last phase of the charging in the system according to the third embodiment, the high-potential side terminal 101 and the low-potential side terminal 102 of the charger 112 may be connected, respectively, to the switches $S_{27a}$ and $S_{26a}$, or the switches $S_{26a}$ and $S_{25a}$. However, in this case, even in an initial phase of the charging, some of the capacitor banks (located on the low potential side, such as the capacitor bank $C_1$) are located electrically far from the charger. Thus, although the voltage variation in the last phase of the charging can be reduced, a voltage variation between the capacitor banks will occur even in the initial phase of the charging. The fourth embodiment is directed, but not limited, to solving this problem.

The fourth embodiment will be described based on an example where, similarly to the first embodiment, m capacitor banks each having a rated voltage Vc are connected in series, n taps (a first switch group and a second switch group each composed of n switches) are provided, respectively, for capacitor units each composed of h of the capacitor banks, and the capacitor module including a balancing circuit 105 is subjected to full charging at a voltage Vin using a charger 112 (inter-terminal voltage=Vc×m), where: m=100; n=51; and h=2.

Switches $S_{2a}$ to $S_{51a}$ make up a first switch group 110', and switches $S_{1b}$ to $S_{50b}$ make up a second switch group 111'. Each of the switches $S_{2a}$ to $S_{51a}$ and each of the switches $S_{1b}$ to $S_{50b}$ are connected, respectively, between a corresponding one of the taps led out from respective ones of a plurality of series-connection points between the capacitor units, and a high-potential side terminal 101 of the charger 112, and between a corresponding one of the taps, and a low-potential side terminal 102 of the charger 112.

An operation of the system according the fourth embodiment will be described below. In an initial phase of charging, a switch control circuit 108 operates to perform charging by turning on the switches $S_{51a}$ and $S_{1b}$. At this time, all of the capacitor banks of the capacitor module 108 are directly charged from the charger 112.

As the charging progresses, a voltage across each of the capacitor banks will be gradually increased, and a charger voltage will reach Vin. When a voltage determination circuit 107 determines, based on a voltage detection result from a voltage detection circuit 106, that the charger voltage reaches Vin, the switch control circuit 108 operates to turn off the switch $S_{51a}$ and simultaneously turn on the switch $S_{50a}$, so that the tap for connecting the high-potential side terminal 101 of the charger 112 and the capacitor module 109 is shifted toward the low potential side by one. In this state, the capacitor banks $C_1$ to $C_{98}$ are charged not via the balancing circuit but directly by the charger, and the capacitor banks $C_{99}$ and $C_{100}$ are charged via the balancing circuit.

When the charging further progresses, and the voltage determination circuit 107 determines, based on a voltage detection result from the voltage detection circuit 106, that the charger voltage reaches Vin again, the switch control circuit 108 operates to turn off the switch $S_{1b}$ and simultaneously turn on the switch $S_{2b}$, so that the tap for connecting the low-potential side terminal 102 of the charger 112 and the capacitor module 109 is shifted toward the high potential side by one. In this state, the capacitor banks $C_3$ to $C_{98}$ are charged not via the balancing circuit but directly by the charger, and the capacitor banks $C_1$, $C_2$, $C_{99}$ and $C_{100}$ are charged via the balancing circuit.

Figure 10:
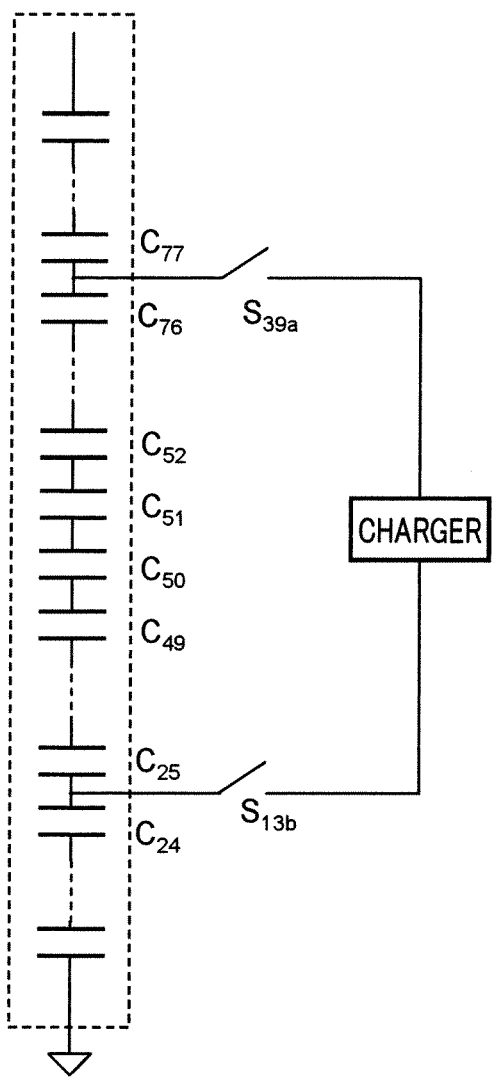
FIG. 10 is a schematic diagram illustrating a state in which switches $S_{39a}$ and $S_{13b}$ are selected to perform charging in the fourth embodiment.

In this way, two of the taps to be connected to the high-potential side terminal 101 and the low-potential side terminal 102 of the charger are sequentially switched according to the progress of the charging. These operations are performed such that the capacitor banks ($C_{50}$, $C_{51}$) adjacent to a center of the capacitor banks making up the capacitor module 109 are located at a center of the capacitor banks which are directly charged by the charger, as illustrated in FIG. 10. FIG. 10 illustrates a state in which the switches are switched sequentially such that the capacitor banks $C_{50}$ and $C_{51}$ are located at the center of the capacitor banks which are directly charged by the charger, and the switches $S_{39a}$ and $S_{13b}$ are selected so that the total fifty-two capacitor banks $C_{25}$ to $C_{76}$ are directly charged by the charger (for simplifying illustration, the balancing circuit and the switches in a non-activated state are omitted). The remaining capacitor banks $C_1$ to $C_{24}$ and $C_{77}$ to $C_{100}$ are charged via the balancing circuit. Based on switching the switches in the above manner, it becomes possible to shorten an electrical distance between the charger and each of the capacitor banks to be charged via the balancing circuit, as much as possible.

When the charging further progresses, and the number of series-connected ones of the capacitor banks which are to be directly charged by the charger, becomes less than half of a number m of all of the series-connected capacitor banks in the capacitor module 109, the capacitor banks of the capacitor module 109 are grouped into two groups, in such a manner that each of the capacitor banks around $C_{m \times 1/4}$ (i.e., $C_{25}$) and $C_{m \times 3/4}$ (i.e., $C_{75}$) is located at a center of each of the two groups of the series-connected capacitor banks to be directly charged by the charger, and the switch control circuit 108 operates to, with respect to each of the two groups, select two of the switches to perform charging by the charger in a time division manner.

Figure 11:
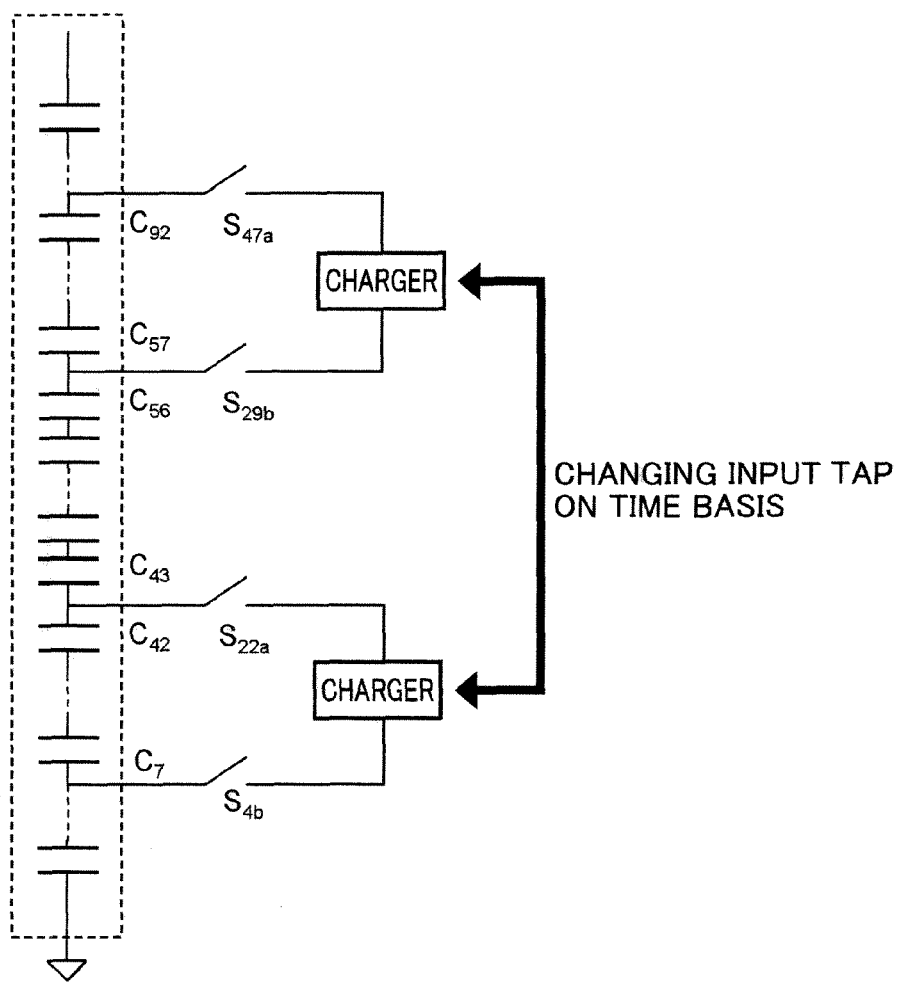
FIG. 11 is a schematic diagram illustrating a state in which capacitor units are grouped into two groups and each of the group of capacitor units are charged in a time division manner in the fourth embodiment.

FIG. 11 illustrates a state in which the switch control circuit 108 operates to select the switches $S_{47a}$ and $S_{29b}$ and the switches $S_{22a}$ and $S_{4b}$ such that the capacitor banks around $C_{25}$ and $C_{75}$ are located at a center of each of the two groups of the series-connected capacitor banks to be directly charged by the charger, so that the group of capacitor banks $C_{57}$ to $C_{92}$ and the group of capacitor banks $C_7$ to $C_{42}$ are charged alternately and directly by the charger in a time division manner.

During a period where the switch control circuit 108 operates to perform the charging via the switches $S_{47a}$ and $S_{29b}$, the capacitor banks $C_{57}$ to $C_{92}$ are directly charged by the charger, and the remaining capacitor banks are charged via the balancing circuit. On the other hand, during a period where the switch control circuit 108 operates to perform the charging via the switches $S_{22a}$ and $S_{4b}$, the capacitor banks $C_7$ to $C_{42}$ are directly charged by the charger, and the remaining capacitor banks are charged via the balancing circuit. In this case, with a view to keeping voltages across the respective capacitor banks as equal as possible, it is desirable to alternately switch between two sets of the switches $S_{47a}$ and $S_{29b}$ and the switches $S_{22a}$ and $S_{4b}$ such that the time each of the capacitor units is directly charged by the charger is equal.

Figure 12:
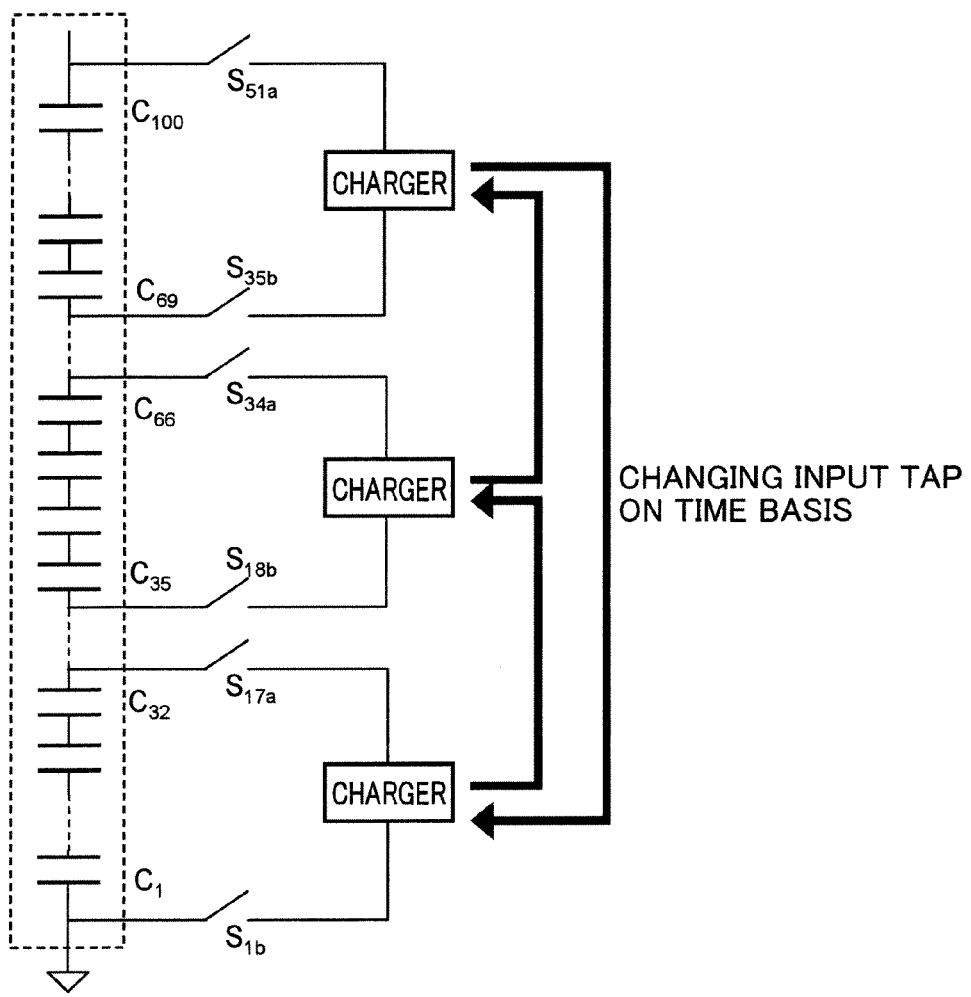
FIG. 12 is a schematic diagram illustrating a state in which capacitor units are grouped into three groups and each of the group of capacitor units are charged in a time division manner in the fourth embodiment.

Subsequently, in the same manner, when the charging further progresses, and the number of series-connected ones of the capacitor banks which are to be directly charged by the charger, becomes less than one-third of the number of all of the series-connected capacitor banks in the capacitor module 109, the capacitor banks of the capacitor module 109 are grouped into three groups, in such a manner that each of the capacitor banks around $C_{m \times 1/6}$ (i.e., $C_{17}$), $C_{m \times 3/6}$ (i.e., $C_{50}$) and $C_{m \times 5/6}$ (i.e., $C_{83}$) is located at a center of each of the three groups of the series-connected capacitor banks to be directly charged by the charger, and the switch control circuit 108 operates to, with respect to each of the three groups, select two of the switches to perform charging by the charger in a time division manner. FIG. 12 illustrates a state in which the switch control circuit 108 operates to select the switches $S_{51a}$ and $S_{35b}$, the switches $S_{34a}$ and $S_{18b}$, the switches $S_{17a}$ and $S_{1b}$, so that the group of capacitor banks $C_{69}$ to $C_{100}$, the group of capacitor banks $C_{35}$ to $C_{66}$, and the group of capacitor banks $C_1$ to $C_{32}$ are charged alternately and directly by the charger.

Figure 13:
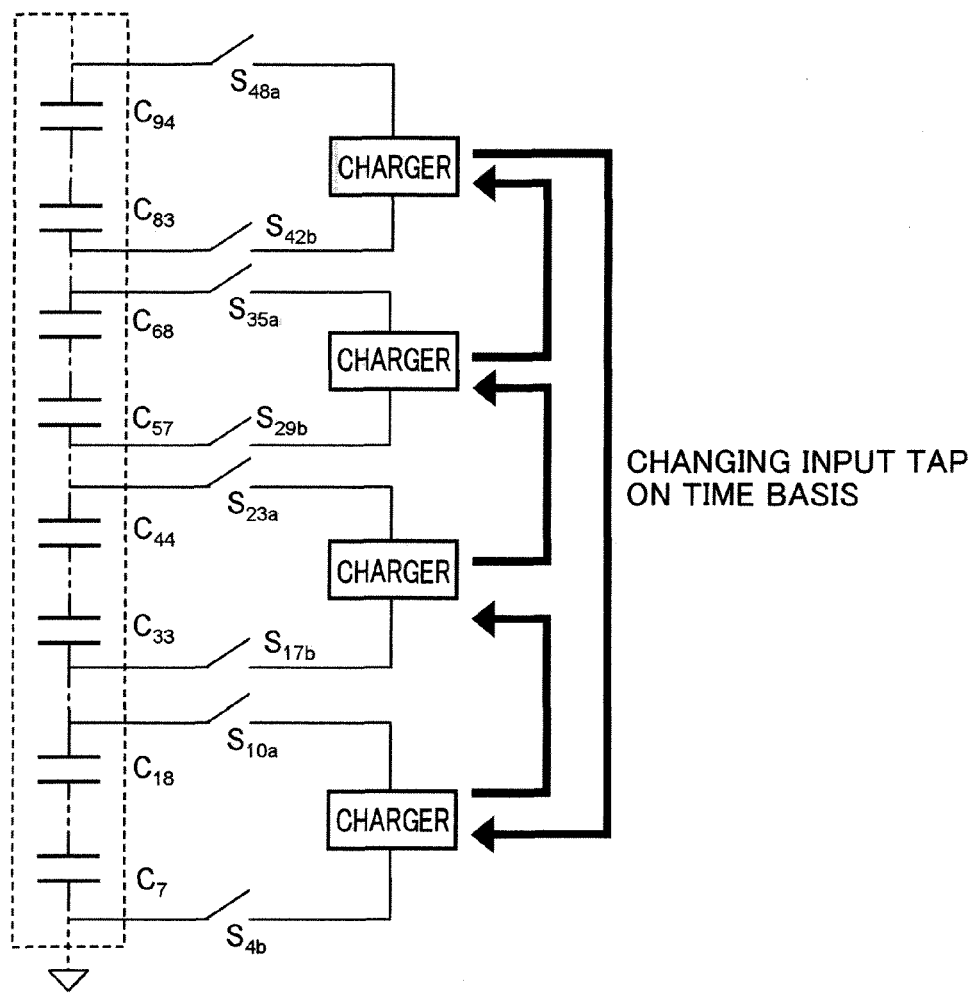
FIG. 13 is a schematic diagram illustrating a state in which capacitor units are grouped into four groups and each of the group of capacitor units are charged in a time division manner in the fourth embodiment.

Subsequently, in the same manner, when the charging further progresses, and the number of series-connected ones of the capacitor banks which are to be directly charged by the charger, becomes less than one-fourth of the number of all of the series-connected capacitor banks in the capacitor module 109, the capacitor banks of the capacitor module 109 are grouped into four groups, in such a manner that each of the capacitor banks around $C_{m \times 1/8}$ (i.e., $C_{13}$), $C_{m \times 3/8}$ (i.e., $C_{38}$), $C_{m \times 5/8}$ (i.e., $C_{63}$) and $C_{m \times 7/8}$ (i.e., $C_{88}$) is located at a center of the series-connected capacitor banks to be directly charged by the charger, and the switch control circuit 108 operates to, with respect to each of the four groups, select switches to perform charging by the charger in a time division manner. FIG. 13 illustrates a state in which the switch control circuit 108 operates to select the switches $S_{48a}$ and $S_{42b}$, the switches $S_{35a}$ and $S_{29b}$, the switches $S_{23a}$ and $S_{17b}$, the switches $S_{10a}$ and $S_{4b}$, so that the group of capacitor banks $C_{83}$ to $C_{94}$, the group of capacitor banks $C_{57}$ to $C_{68}$, the group of capacitor banks $C_{33}$ to $C_{44}$, and the group of capacitor banks $C_7$ to $C_{18}$ are charged alternately and directly by the charger.

In either of the above grouped charging stages, with a view to keeping voltages across the respective capacitor banks as equal as possible, it is desirable to switch the switches such that the time each of the capacitor units is directly charged by the charger is equal.

The above operation will be repeated until a total value of the rated voltages of the capacitor banks to be directly charged by the charger becomes less than the charging voltage Vin by the charger. In other words, the above grouped charging will be repeated until the following relation is satisfied: x×Vc<Vin, where x is the number of series-connected ones of the capacitor banks which are to be directly charged by the charger. Based on repeating the above operation, it becomes possible to more equally perform the charging to each of the capacitor banks and thus shorten a charging time.

In a system having a similar configuration to the above embodiment, under conditions: m=25; n=26; h=1; and a capacitance of each of two capacitor banks $C_1$ and $C_{25}$ is set to be two times that of each of the remaining capacitor banks, a capacitor module was charged, using a balancing circuit limited in equalization capability. FIG. 14A illustrates one example of charging waveforms of a part ($C_1$, $C_5$, $C_{10}$, $C_{15}$, $C_{20}$ and $C_{25}$) of the capacitor banks. The charging waveforms of the respective capacitor banks well coincide with each other, which shows that the respective capacitor banks are equally charged. FIG. 14A also shows that the charging time for each of the capacitor banks is short. It is proven that significant improvement is achieved as compared to FIG. 7 illustrating the example of the first embodiment.

In the above embodiment, the charging is started under a condition that a plurality of electric energy storage banks making up an electric energy storage module are not grouped. Alternatively, the charging may be started under a condition that the plurality of electric energy storage banks making up the electric energy storage module are grouped into a plurality of groups. In this case, in the above embodiment, the switches are switched such that the number of ones of the capacitor units which are to be directly charged by the charger is reduced. Alternatively, the switches may be switched such that, with respect to each of the plurality of groups, the same at least one capacitor unit is repeatedly subjected to direct charging by the charger, in a time division manner. This also makes it possible to shorten an electrical distance from the charger to the capacitor units to be charged via the balancing unit to more equally perform the charging to each of the capacitor banks.

In a system having the similar configuration to that illustrated in FIG. 12, under conditions: m=25; n=26; h=1; a capacitance of each of two capacitor banks $C_1$ and $C_{25}$ is set to be two times that of each of the remaining capacitor banks; and the capacitor banks are grouped into three groups $C_3$-$C_7$, $C_{11}$-$C_{15}$ and $C_{19}$-$C_{23}$, with respect to each of the three groups, the same $C_3$-$C_7$, $C_{11}$-$C_{15}$ and $C_{19}$-$C_{23}$ were repeatedly subjected to direct charging by the charger, using a balancing circuit limited in equalization capability. FIG. 14B illustrates one example of charging waveforms of a part ($C_1$, $C_5$, $C_{10}$, $C_{15}$, $C_{20}$ and $C_{25}$) of the capacitor banks. The charging waveforms of the respective capacitor banks excellently coincide with each other, which shows that the respective capacitor banks are equally charged. It is proven that significant improvement is achieved as compared to FIG. 7 illustrating the example of the first embodiment. Further, a comparison with FIG. 14A illustrating the aforementioned example shows that the capacitor banks can be more equally used, although it is necessary to take time for charging.

Figure 15:
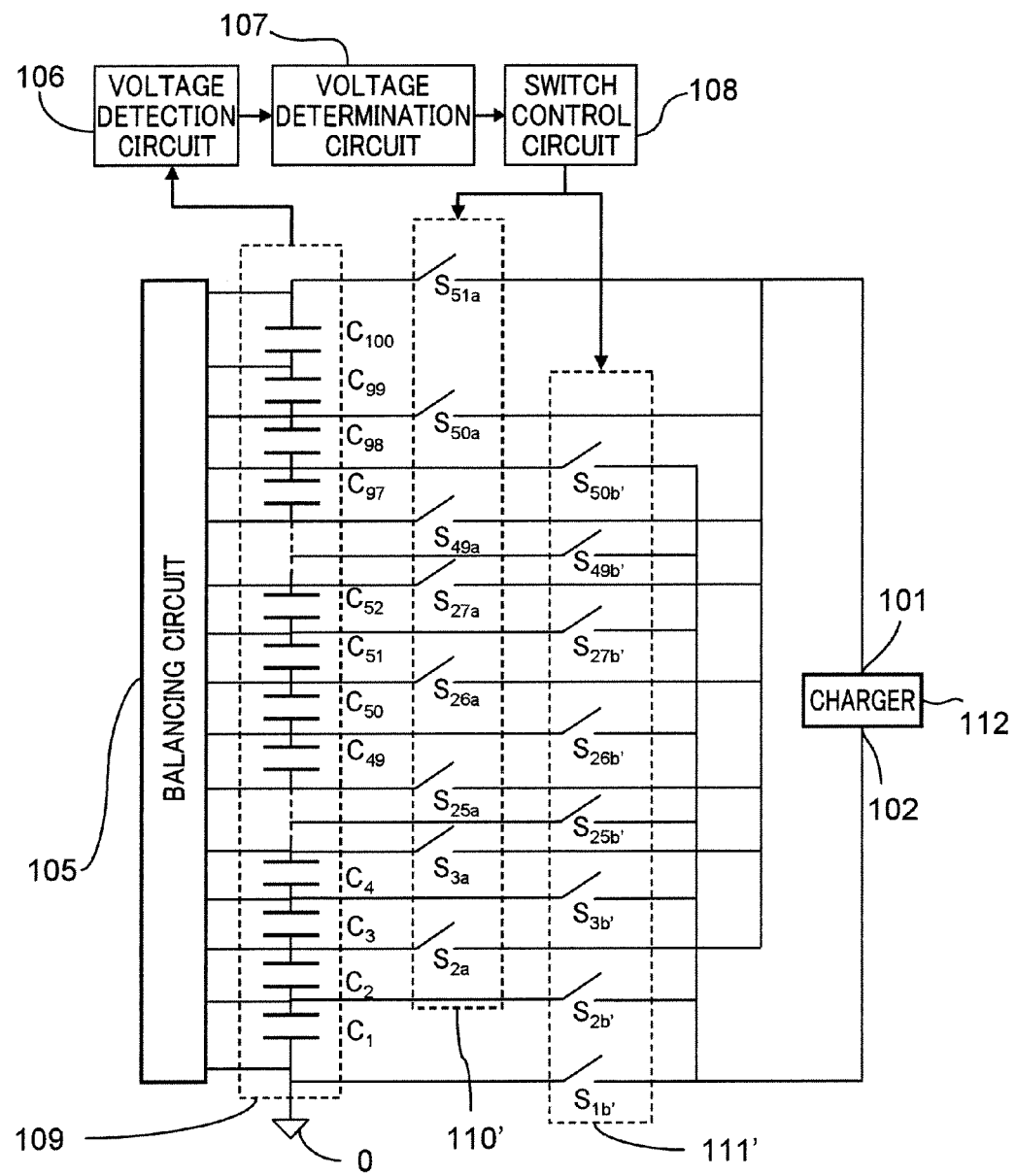
FIG. 15 is a circuit diagram illustrating an electric energy storage system as an example of modification of the fourth embodiment of the present invention.

In the fourth embodiment, a layout, such as a position and the number of the switches, may be appropriately changed or modified, as long as the system of the layout may sequentially switch the switches such that one of the plurality of taps is connected to the one terminal or the other terminal of the charger, and control the number of at least one of the plurality of electric energy storage units which is to be charged not via the balancing circuit but directly from the charger. For example, a modified embodiment may include a system illustrated in FIG. 15. Further, for example, in cases where the charger is a type in which an output voltage is likely to fluctuate, such as a solar cell, it is conceivable to switch the switches during the charging process so as to increase the number of ones of the electric energy storage units which are to be directly charged by the charger, as the output voltage increases. Thus, switchings of the switches to reduce, retain or increase the number of ones of the electric energy storage units which are to be directly charged by the charger, according to a voltage detection result from the voltage detection circuit may be appropriately combined.

In the fourth embodiment, a position of the electric energy storage unit where the charging is started, the number of groups in each grouping phase of the plurality of electric energy storage banks making up the electric energy storage module and the number of the electric energy storage banks in each of the groups, and the like may be arbitrarily selected.

In the above embodiments, a timing of switching the switches by the switch control circuit 108 corresponds to a time when it is determined that the charger voltage reaches Vin, based on a voltage detection result from the voltage detection circuit 106. Alternatively, a criterial value of the charge voltage for the determination may be any voltage value which is less than Vin.

The above description has been made about a charging operation. The techniques of the present invention may also be applied to an operation of performing discharging to a load.

FIFTH EXAMPLE

Figure 16:
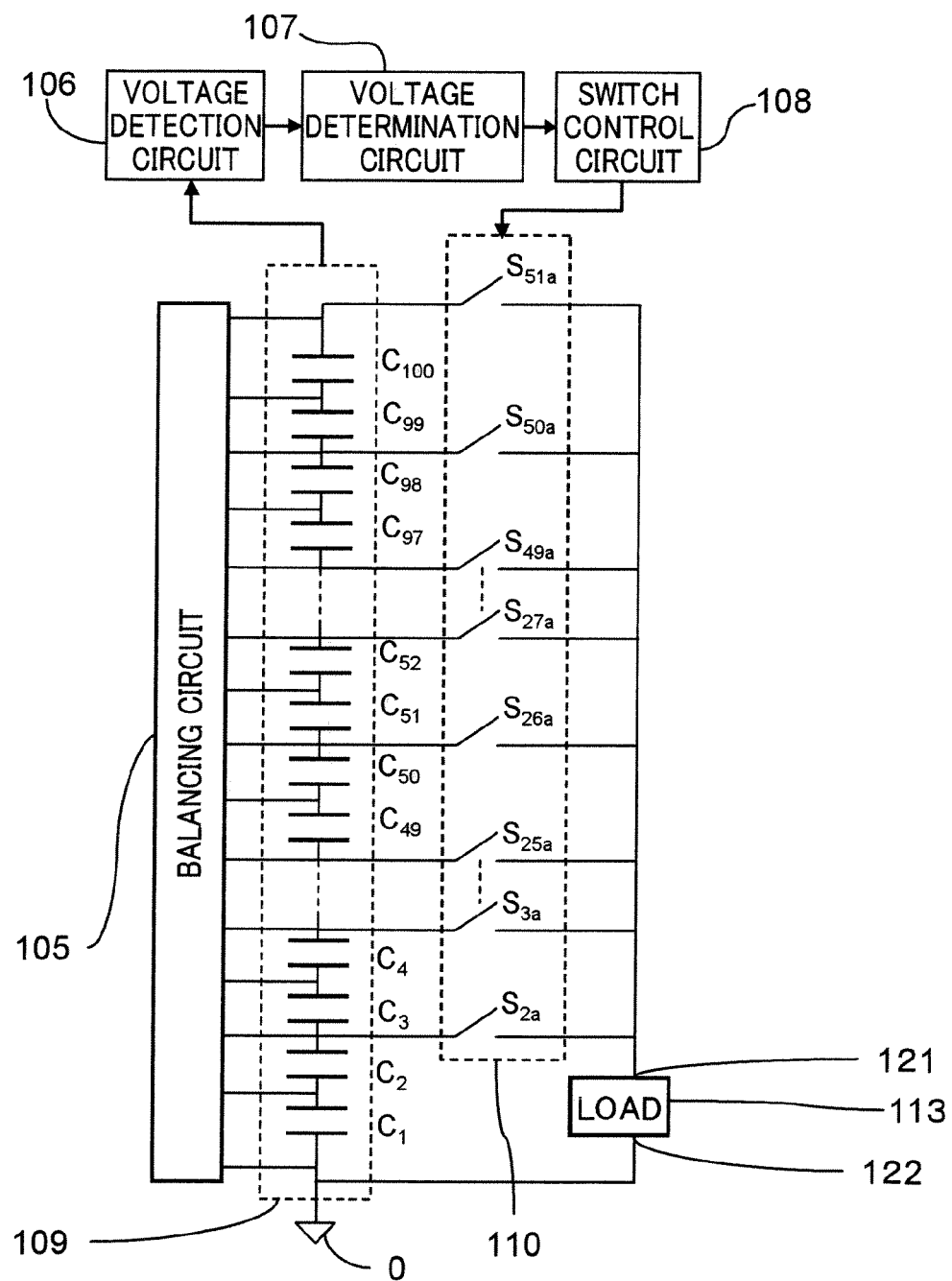
FIG. 16 is a circuit diagram illustrating an electric energy storage system according to a fifth embodiment of the present invention.

FIG. 16 is a circuit diagram illustrating an electric energy storage system according to a fifth embodiment of the present invention. In FIG. 16, an element or component corresponding to that in FIG. 4 is defined by a common reference numeral or code, and duplicate description of the same element or component as that in the first embodiment will be omitted.

The system according to the fifth embodiment is formed by replacing the charger in the system according to the first embodiment with a load 113, and fundamentally, performing operations (sequence of switching the switches, etc.) reverse to those during the charging enables the capacitor banks to be equally discharged while suppressing fluctuation of an output voltage.

Figure 17:
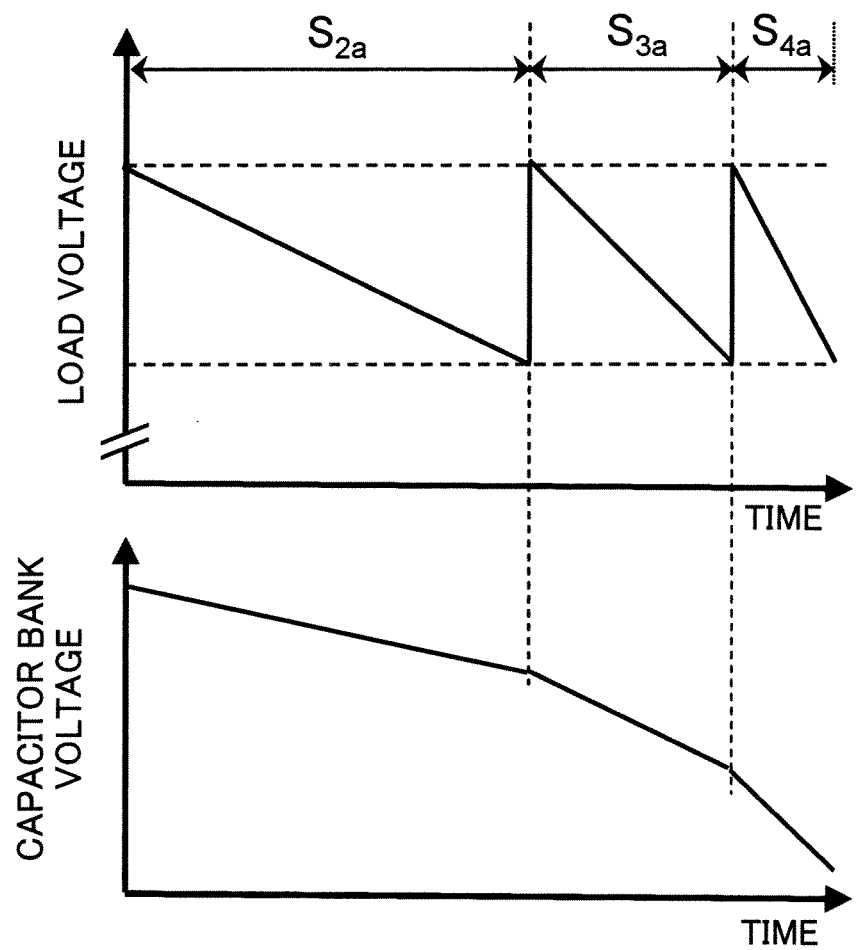
FIG. 17 is graphs illustrating a load voltage (upper graph) and a capacitor bank discharge curve (lower graph) when discharging is performed in the electric energy storage system according to the fifth embodiment.

FIG. 17 illustrates operational waveforms when discharging is performed in the system illustrated in FIG. 16. Reverse to the charging operation in the first embodiment described in connection with FIGS. 5 and 6, the discharging operation is started under a condition that the switch $S_{2a}$ is turned on, and the switch control circuit 108 is operable to sequentially switch the switches toward a higher potential side to prevent a load voltage from becoming less than a certain arbitrary value (e.g., an allowable lower limit $V_{low}$ of the load voltage), by determining by the voltage determination circuit 107 the load voltage detected by the voltage detection circuit 106, so as to keep the load voltage within an arbitrary range. The capacitor bank ($C_1$ and $C_2$ during turn-on of the switch $S_{2a}$) directly connected to the load is directly discharged to the load, and the remaining capacitor banks are discharged via the balancing circuit.

SIXTH EXAMPLE

Figure 18:
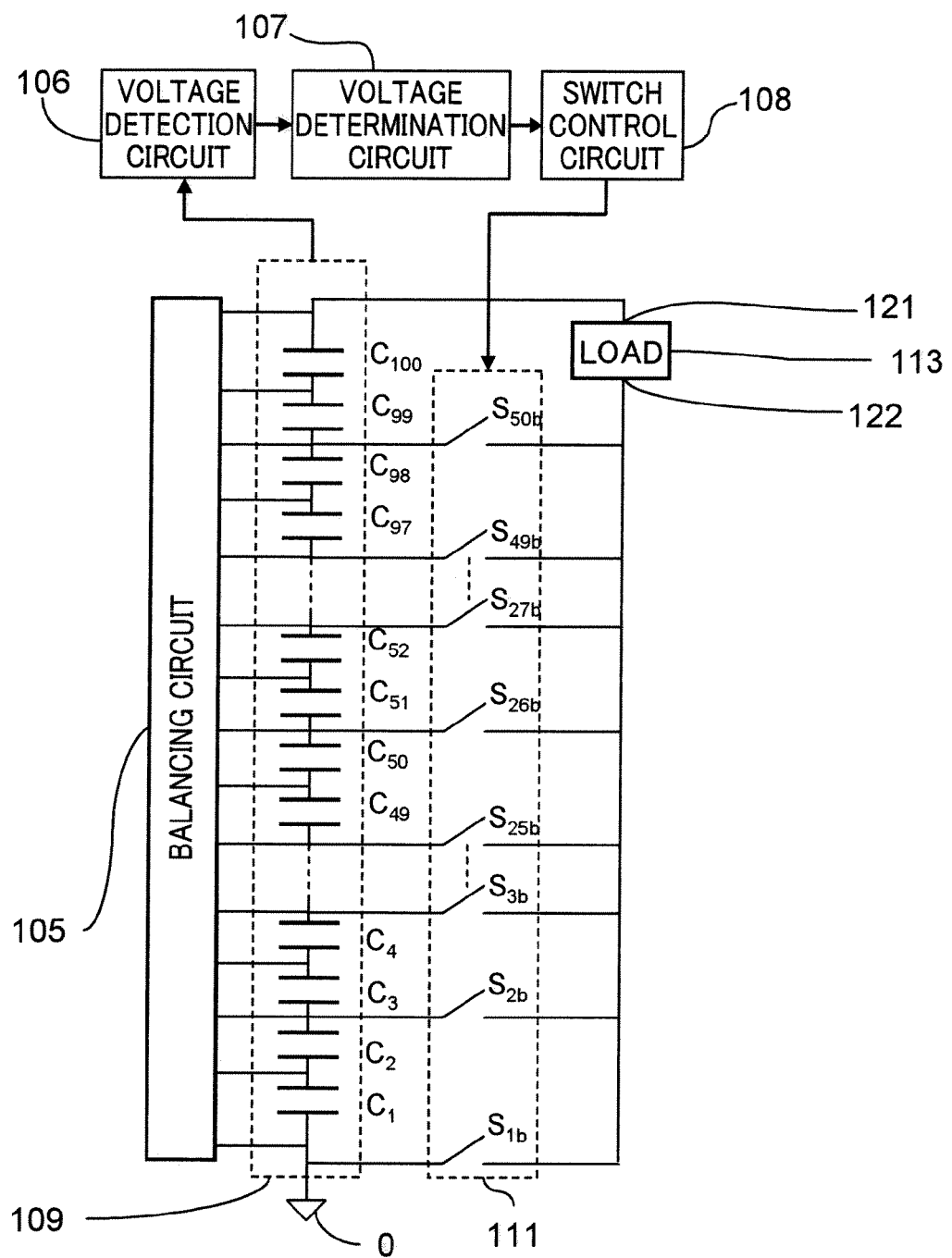
FIG. 18 is a circuit diagram illustrating an electric energy storage system according to a sixth embodiment of the present invention.

FIG. 18 is a circuit diagram illustrating an electric energy storage system according to a sixth embodiment of the present invention. In FIG. 18, an element or component corresponding to that in FIG. 16 is defined by a common reference numeral or code, and duplicate description of the same element or component as that in the fifth embodiment will be omitted.

The fifth embodiment is configured such that the switch group 110 is provided between a high-potential side terminal 121 of the load 113 and the capacitor module 109. Differently, in the sixth embodiment, a switch group 111 is provided between a low-potential side terminal 122 of the load 113 and the capacitor module 109. In the sixth embodiment, the switch control circuit 108 is operable, based on a voltage detection result from the voltage detection circuit 106, to switch switches in order of $S_{50b}$, $S_{49b}$, ..., $S_{1b}$.

SEVENTH EXAMPLE

Figure 19:
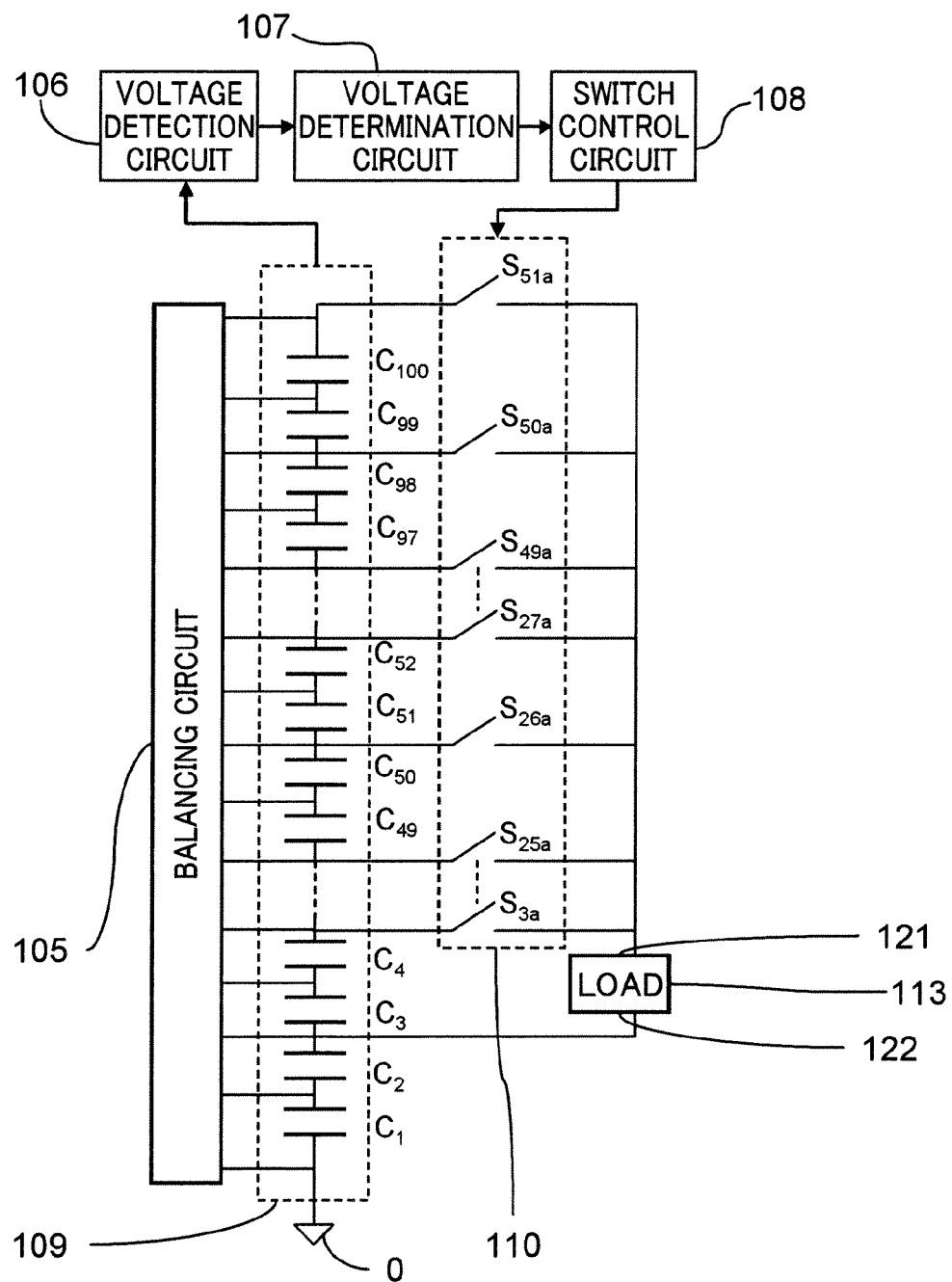
FIG. 19 is a circuit diagram illustrating an electric energy storage system according to a seventh embodiment of the present invention.

FIG. 19 is a circuit diagram illustrating an electric energy storage system according to a seventh embodiment of the present invention. In FIG. 19, an element or component corresponding to that in FIG. 16 is defined by a common reference numeral or code, and duplicate description of the same element or component as that in the fifth embodiment will be omitted.

The fifth embodiment is configured such that the low-potential side terminal 122 of the load 113 is directly connected to the ground 0 of the capacitor module 109. Differently, in the seventh embodiment, the low-potential side terminal 122 is not directly connected to the ground 0 of the capacitor module 109 but fixedly connected to the series-connection point between the capacitor banks $C_2$ and $C_3$.

In the seventh embodiment, the switch control circuit 108 is operable, based on a voltage detection result from the voltage detection circuit 106, to sequentially switch switches in order of $S_{3a}, S_{4a}, \ldots, S_{51a}$.

Differently from the fifth embodiment configured such that the low-potential side terminal 122 of the load 113 is connected to the ground 0 of the capacitor module 109, in the seventh embodiment configured such that the low-potential side terminal of the load is directly connected to the ground terminal of the capacitor module, an electrical distance between the load and the capacitor bank in an initial phase of a charging process can be shortened as compared to the system according to the fifth embodiment. Specifically, in the initial phase of the charging process in the seventh embodiment, the switch $S_{3a}$ is turned on, so that the capacitor banks $C_3$ and $C_4$ are directly discharged to the load, and the capacitor banks $C_1$, $C_2$ and $C_5$ to $C_{100}$ are discharged via the balancing circuit. In the fifth embodiment, the capacitor bank $C_{100}$ located electrically farthest from the load 113 is away from the load by a distance corresponding to ninety-eight capacitor banks, whereas, in the system according to the seventh embodiment, the low-potential side terminal 122 of the load 113 is connected to a position (the series-connection point between the capacitor banks $C_2$ and $C_3$) of higher potential side by a distance corresponding to two capacitor banks. Thus, the capacitor bank $C_{100}$ is away from the load by a distance corresponding to ninety-six capacitor banks, i.e., closer to the load by a distance corresponding to two capacitor banks, as compared to the system according to the fifth embodiment. This makes it possible to suppress a voltage variation between the capacitor banks in the initial phase of the charging process at a lower level, as compared to the system according to the fifth embodiment.

In order to minimize a voltage variation between the capacitor banks in the initial phase of the charging process in the system according to the seventh embodiment, the high-potential side terminal 121 and the low-potential side terminal 122 of the load 113 may be connected, respectively, to the switches $S_{27a}$ and $S_{26a}$, or the switches $S_{26a}$ and $S_{25a}$.

It is to be understood that a layout, such as a position and the number of the switches, in the fifth to seventh embodiments, may be appropriately changed or modified, as needed.

EIGHTH EXAMPLE

Figure 20:
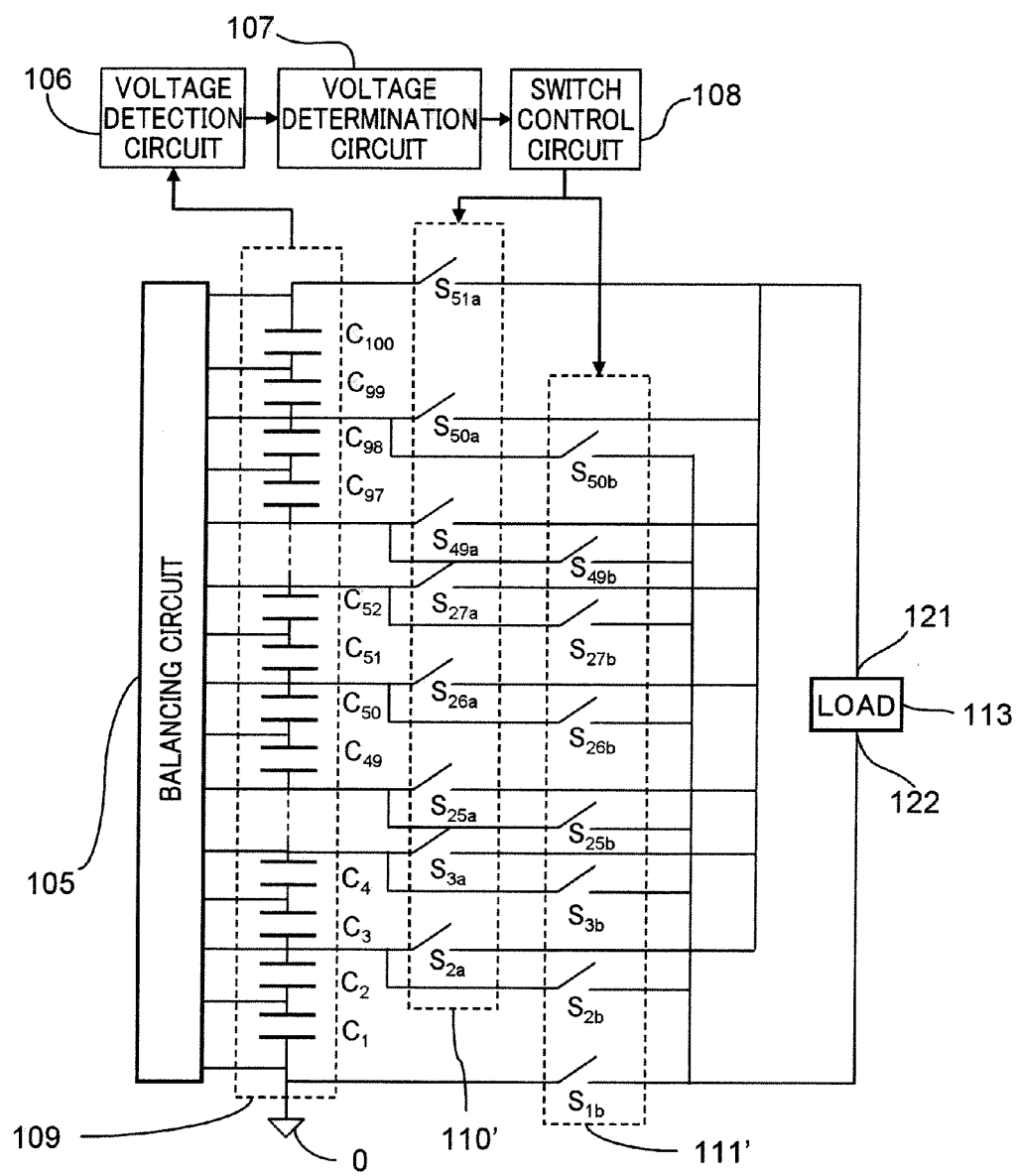
FIG. 20 is a circuit diagram illustrating an electric energy storage system according to an eighth embodiment of the present invention.

FIG. 20 is a circuit diagram illustrating an electric energy storage system according to an eighth embodiment of the present invention. In FIG. 20, an element or component corresponding to that in FIG. 16 is defined by a common reference numeral or code, and duplicate description of the same element or component as that in the fifth embodiment will be omitted.

The system according to the eighth embodiment is formed by replacing the charger in the system according to the fourth embodiment with a load 113, and fundamentally, performing operations (sequence of switching the switches, sequence of grouping of the capacitor banks, etc.) reverse to those during the charging enables the capacitor banks to be equally discharged while suppressing fluctuation of an output voltage. The eighth embodiment will be described based on an example where in the electric energy storage system including a balancing circuit 105, similarly to the fourth embodiment, m capacitor banks each having a rated voltage Vc are connected in series, n taps (a first switch group and a second switch group each composed of n switches) are provided, respectively, for capacitor units each composed of h of the capacitor banks, and discharging is performed to the load 113, where: m=100; n=51; and h=2.

Switches $S_{2a}$ to $S_{51a}$ make up a first switch group 110', and switches $S_{1b}$ to $S_{50b}$ make up a second switch group 111'. Each of the switches $S_{2a}$ to $S_{51a}$ and each of the switches $S_{1b}$ to $S_{50b}$ are connected, respectively, between a corresponding one of the taps led out from respective ones of a plurality of series-connection points between the capacitor units, and a high-potential side terminal 121 of the load 113, and between a corresponding one of the taps, and a low-potential side terminal 122 of the load 113.

Operations of the system according the eighth embodiment will be described below. As mentioned above, the eighth embodiment is fundamentally designed to perform operations reverse to those in the fourth embodiment designed for a charging process. Then, the following description will be made based on an example where the discharging process is started under a condition that the number of groups is four, i.e. under a condition that the plurality of capacitor banks making up the capacitor module are grouped into four groups.

In the initial phase of the discharging, the capacitor banks in the capacitor module 109 are grouped into four groups, in such a manner that each of the capacitor banks around $C_{m\times 1/8}$ (i.e., $C_{13}$), $C_{m\times 3/8}$ (i.e., $C_{38}$), $C_{m\times 5/8}$ (i.e., $C_{63}$) and $C_{m\times 7/8}$ (i.e., $C_{88}$) is located at a center of each of the four groups of the series-connected capacitor banks to be directly discharged to the load, and the switch control circuit 108 operates to, with respect to each of the four groups, select the switches in such a manner that each of the banks (around banks $C_{13}$, $C_{38}$, $C_{63}$ and $C_{88}$) around at respective centers of the series-connected capacitor banks making up each of the groups is located at a center of each of the groups of the series-connected capacitor banks to be directly discharged to the load, to perform discharging to the load in a time division manner.

Figure 21:
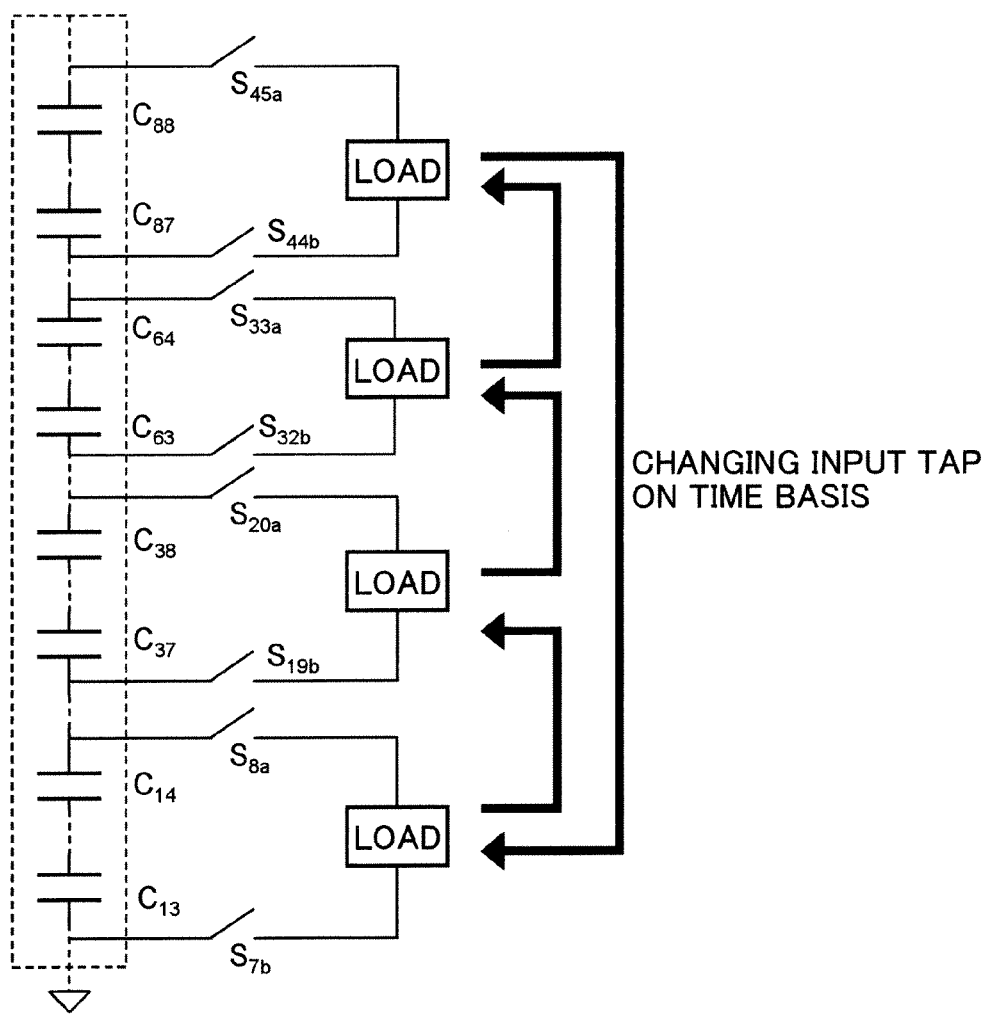
FIG. 21 is a schematic diagram illustrating a state in which capacitor units are grouped into four groups and each of the group of capacitor units are discharged in a time division manner in the eighth embodiment.

FIG. 21 illustrates a state in which the switch control circuit 108 operates to select the switches $S_{8a}$ and $S_{7b}$, the switches $S_{20a}$ and $S_{19b}$, the switches $S_{33a}$ and $S_{32b}$, the switches $S_{45a}$ and $S_{44b}$, so that the group of capacitor banks $C_{13}$ to $C_{14}$, the group of capacitor banks $C_{37}$ to $C_{38}$, the group of capacitor banks $C_{63}$ to $C_{64}$, and the group of capacitor banks $C_{87}$ to $C_{88}$ are discharged alternately to the load. A discharge operation of the four groups will be described by taking the group including the capacitor bank $C_{13}$ as an example. The discharge operation is started under a condition that the switches $S_{8a}$ and $S_{7b}$ are turned on. As the discharging progresses, the voltage across each of the capacitor banks will be gradually lowered. Then, when the voltage determination circuit 107 determines, based on a voltage detection result from the voltage detection circuit 106, that a load voltage reaches an allowable lower limit $V_{low}$ of the load voltage, the switch control circuit 108 operates to turn off the switch $S_{8a}$ and simultaneously turn on the switch $S_{9a}$, so that the tap for connecting the high-potential side terminal 121 of the load 113 and the capacitor module 109 is shifted toward higher potential side by one. In this state, the capacitor banks $C_{13}$ to $C_{16}$ are discharged not via the balancing circuit but directly to the load, and the remaining capacitor banks are discharged via the balancing circuit. When the discharging further progresses, and the voltage determination circuit 107 determines, based on a voltage detection result from the voltage detection circuit 106, that the load voltage reaches $V_{low}$ again, the switch control circuit 108 operates to turn off the switch $S_{7b}$ and simultaneously turn on the switch $S_{6b}$, so that the tap for connecting the low-potential side terminal 122 of the load 113 and the capacitor module 109 is shifted toward lower potential side by one. In this state, the capacitor banks $C_{11}$ to $C_{16}$ are discharged not via the balancing circuit but directly to the load, and the remaining capacitor banks are discharged via the balancing circuit. Based on switching the switches in this manner, it becomes possible to equalize times for allowing the respective capacitor banks to be directly discharged to the load, as evenly as possible, which is desirable in view of keeping voltages of the respective capacitor banks as equal as possible.

Figure 22:
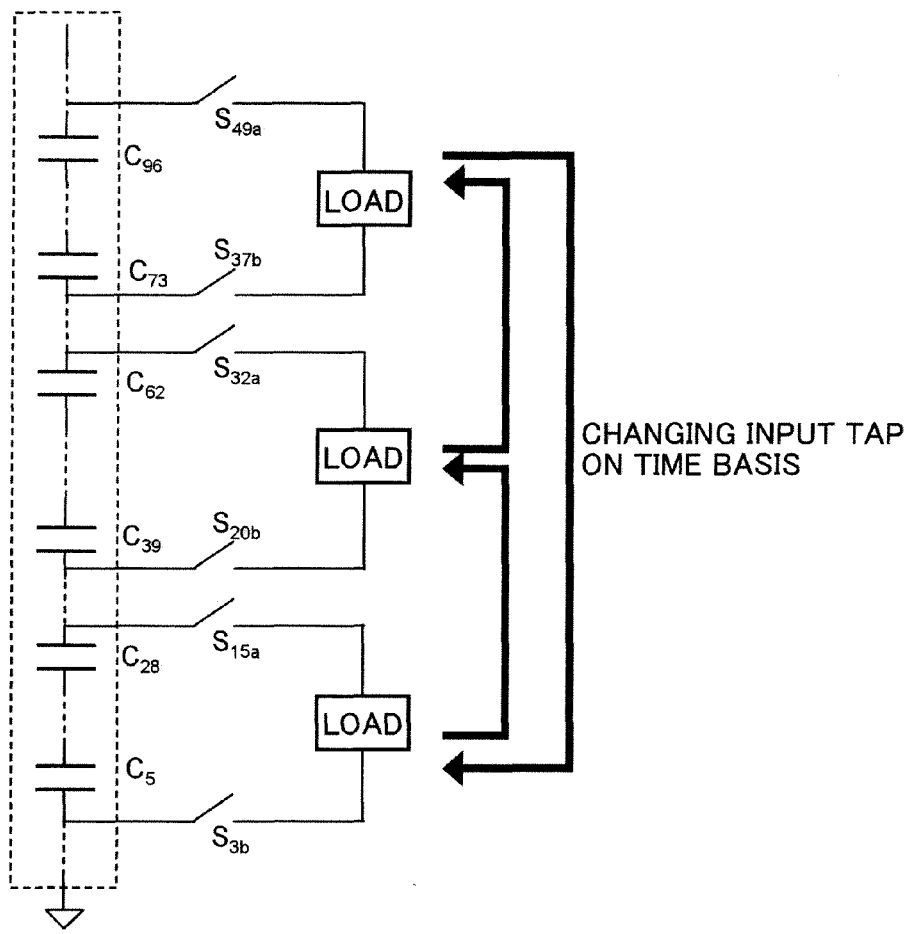
FIG. 22 is a schematic diagram illustrating a state in which capacitor units are grouped into three groups and each of the group of capacitor units are discharged in a time division manner in the eighth embodiment.

Subsequently, when the discharging further progresses, and the number of series-connected ones of the capacitor banks which are to be directly discharged to the load, becomes larger and equal to a predetermined rate (e.g. ¼) with respect to the number of all of the series-connected capacitor banks in the capacitor modules 109, the capacitor banks of the capacitor module 109 are grouped into three groups, in such a manner that each of the capacitor banks around $C_{m \times 1/6}$ (i.e., $C_{17}$), $C_{m \times 3/6}$ (i.e., $C_{50}$) and $C_{m \times 5/6}$ (i.e., $C_{83}$) is located at a center of each of the three groups of the series-connected capacitor banks to be directly discharged to the load, and the switch control circuit 108 operates to, with respect to each of the three groups, select the switches in such a manner that each of the capacitor banks (capacitor banks around $C_{17}$, $C_{50}$ and $C_{83}$) around at respective centers of the three groups of series-connected capacitor banks is located at a center of the series-connected capacitor banks to be directly discharged to the load, to perform discharging to the load in a time division manner. In this state, voltages across the respective capacitor banks are lowered to some extent through the discharging under the grouping into four groups as illustrated in FIG. 21. Thus, it is necessary to select the switches such that a total value of the voltages of the series-connected capacitor banks to be directly connected to the load become greater than the allowable lower limit of the load voltage. As one example, FIG. 22 illustrates a state in which the switch control circuit 108 operates to select the switches $S_{15a}$ and $S_{3b}$, the switches $S_{32a}$ and $S_{20b}$, and the switches $S_{49}$ and $S_{37b}$, so that the group of capacitor banks $C_5$ to $C_{28}$, the group of capacitor banks $C_{39}$ to $C_{62}$ and the group of capacitor banks $C_{73}$ to $C_{96}$ are discharged alternately to the load. The switches are switched by the switch control circuit 108 in each of the groups in the same manner as above, and its description will be omitted.

Figure 23:
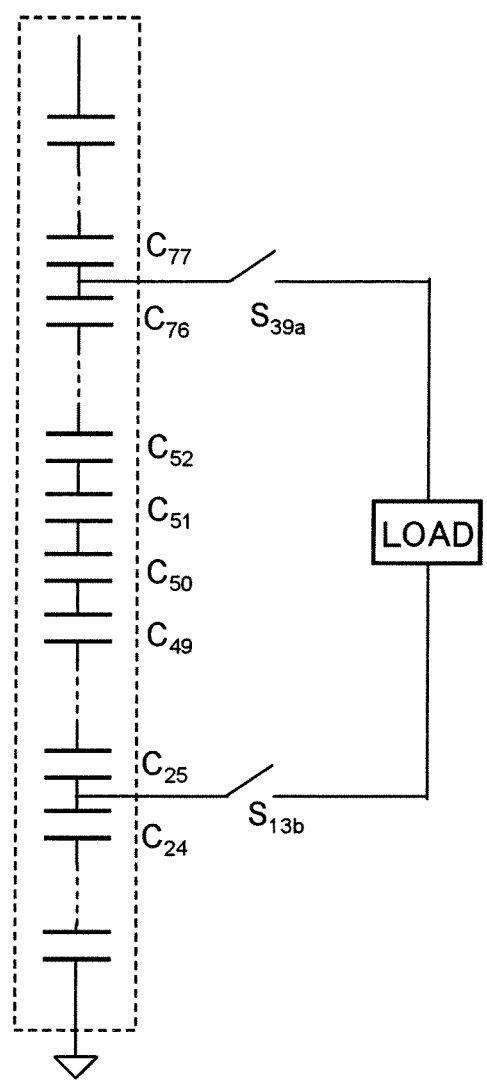
FIG. 23 is a schematic diagram illustrating a state in which switches $S_{39a}$ and $S_{13b}$ are selected to perform discharging in the eighth embodiment.

The similar operation will be repeated until a total value of the voltages across the capacitor banks to be directly discharged to the load in each of the groups becomes less than the allowable lower limit $V_{low}$ of the load voltage. When this operation is repeated, each of the switches $S_{51}$ and $S_{1b}$ are finally set to an ON state, so that all of the capacitor banks are directly discharged to the load, i.e., the number of groups becomes one. FIG. 23 illustrates a state in which the switches $S_{39a}$ and $S_{13b}$ are selected, so that the capacitor banks $C_{25}$ to $C_{76}$ are directly discharged to the load, and the remaining capacitor banks are discharged via the balancing circuit. In other words, the above grouped discharging will be repeated until the following relation is satisfied: $m \times V_{dis} < V_{low}$, where $V_{dis}$ is a voltage across the capacitor bank during the discharging. Based on repeating the above operation, it becomes possible to more equally perform the discharging from each of the capacitor banks and thus increase a discharging time.

In either of the above grouped discharging stages, with a view to keeping voltages across the respective capacitor banks as equally as possible, it is desirable to switch the switches in such a manner that the time each of the capacitor units is directly discharged to the load is equal.

In the eighth embodiment, the switches are switched to increase the number of ones of the capacitor units which are to be directly discharged to the load. Alternatively, the switches may be switched such that, with respect to each of the plurality of groups, the same at least one capacitor unit is repeatedly subjected to direct discharging to the load, in a time division manner. This also makes it possible to shorten an electrical distance from the load to the capacitor units to be discharged via the balancing unit to more equally perform the discharging from each of the capacitor banks.

In the eighth embodiment, a layout, such as a position and the number of the switches, may be arbitrarily changed or modified, as long as the system of the layout may sequentially switch the switches such that one of the plurality of taps is connected to the one terminal or the other terminal of the load, and control the number of at least one of the plurality of electric energy storage units which is to be discharged not via the balancing circuit but directly to the load, as with the fourth embodiment. Further, for example, in cases where the discharging to a load and the charging from a charger are simultaneously performed, when a charging power from the charger is greater than a discharging power to the load, the switches may be switched to reduce the number of ones of the electric energy storage units which are to be directly discharged to the load during the discharging process. Thus, switchings of the switches to reduce, retain or increase the number of ones of the electric energy storage units which are to be directly discharged to the load, according to a voltage detection result from the voltage detection circuit may be appropriately combined.

In the eighth embodiment, a position of the electric energy storage unit where the discharging is started, the number of groups in each grouping phase of the plurality of electric energy storage banks making up the electric energy storage module and the number of the electric energy storage banks in each of the groups, and the like may be arbitrarily selected.

In the eighth embodiment, a timing of switching the switch by the switch control circuit 108 corresponds to a time when it is determined that the load voltage reaches $V_{low}$, based on a voltage detection result from the voltage detection circuit 106. Alternatively, a criterial value of the load voltage for the determination may be any voltage value which is greater than $V_{low}$ and equal to or less than an allowable upper voltage limit of the load.

The above embodiments have been described based on the case where a voltage across each of the capacitor banks making up the capacitor module 109 is detected by the voltage detection circuit 106, the voltage detection circuit 106 is compared with a reference voltage in the voltage determination circuit 107, and the switches are switched by the switch control circuit 108 based on a result of the comparison to control a charging voltage from a charger or a discharging voltage to a load to fall within a certain arbitrary range. Alternatively, instead of detecting a voltage across each of the capacitor banks making up the capacitor module 109, the charging voltage from the charger or the discharging voltage to the load may be detected to switch the switches based on a result of the detection. In this case, the capacitor bank voltage, the charging voltage from the charger, and the discharging voltage to the load exhibit the same tendency as the characteristics described above.

Although the above embodiments have been described based on the system where n taps are provided and each of the n taps are provided every capacitor unit composed of h capacitor banks, the number of capacitor banks making up the capacitor unit (a distance between adjacent two of the taps) may be arbitrarily changed depending on positions, for example, in such a manner that the number is set to h at one position and to (h+1) at another position.

In the above embodiments, the rated voltage of each of the capacitor banks is Vc. Alternatively, the rated voltage may be arbitrarily changed in each of the capacitor banks, for example, in such a manner that one of the capacitor banks has Vc', and one of the capacitor banks has Vc''.

In an aspect of this disclosure, an electric energy storage system is designed to equally utilize a plurality of electric energy storage banks during charging/discharging, and keep fluctuation of an input voltage from a charger or an output voltage to a load, within an arbitrary range, while equally utilizing the electric energy storage banks during charging/discharging. The electric energy storage system comprises an electric energy storage module, a charger, a balancing circuit, a voltage detection section, a plurality of taps led out, respectively, from one of opposite terminals of the electric energy storage module and/or the other terminal of the electric energy storage module and/or one or more of a plurality of series-connection points between the electric energy storage units, through respective switches, and a switch control section for switching the switches such that one of the plurality of taps is connected to one of opposite terminals of the charger. The switch control section is operable to sequentially switch the switches according to progress of the charging, based on a detection result from the voltage detection section, so as to control the number of at least one of the plurality of electric energy storage units which is to be charged not via the balancing circuit but directly from the charger.

Although the above embodiments have been described based on an example where a capacitor is used as the electric energy storage cell, the present invention may be applied to a system using any electric energy storage bank other than the capacitor bank, such as a secondary battery.

Although some embodiments of the invention have been shown and described by way of example, it is obvious to those skilled in the art that various changes and modifications may be made therein without departing from the spirit and scope thereof as set forth in the appended claims.

EXPLANATION OF CODES

101: high-potential side terminal of charger
102: low-potential side terminal of charger
105: balancing circuit
106: voltage detection circuit
107: voltage determination circuit
108: switch control circuit
109: capacitor module
110: switch group
111: switch group
110': first switch group
111': second switch group
112: charger
113: load
121: high-potential side terminal of load
122: low-potential side terminal of load

What is claimed is:

1. An electric energy storage system comprising:
   an electric energy storage module having a plurality of electric energy storage units connected in series, each of the plurality of electric energy storage units having one electric energy storage bank or a plurality of electric energy storage banks connected in series;
   a charger configured to charge at least one of the electric energy storage banks;
   a balancing circuit connected to the electric energy storage module to correct a variation in charged/discharged state between the electric energy storage banks;
   a voltage detection section configured to detect a voltage across the electrical energy storage module, across one or more of the electric energy storage banks, or across the charger;
   a plurality of taps led out, respectively, from one of opposite terminals of the electric energy storage module, from the other terminal of the electric energy storage module and from one or more of a plurality of series-connection points between the electric energy storage units; and
   a switch control section configured to switch switches, wherein at least one of the switches is connected to one of the opposite terminals of the electric energy storage module, to the other terminal of the electric energy storage module, or to at least one of the plurality of series-connection points, the switch control section configured to allow one of the plurality of taps to be connected to one of opposite terminals of the charger, the switch control section being operable, during a charging period, to sequentially switch the switches according to progress of the charging, based on a detection result from the voltage detection section, the switch control section configured to control a first number of at least one of the plurality of electric energy storage units to bypass the charger and be charged via the balancing circuit when a second number of at least one of the plurality of electric energy storage units bypasses the balancing circuit and is charged directly from the charger.

2. The electric energy storage system as defined in claim 1, wherein the switch control section is configured to switch the switches such that one of the plurality of taps is connected to one of opposite terminals of the charger and another of the plurality of taps is connected to the other terminal of the charger.

3. The electric energy storage system as defined in claim 2, wherein the switch control section is operable, after switching the switches for a predetermined number of times, with respect to each of a plurality of groups set by grouping the plurality of electric energy storage units, to subsequently sequentially switch the switches according to progress of the charging, based on a detection result from the voltage detection section and in a time division manner, so as to control a number of at least one of the plurality of electric energy storage units to be charged not via the balancing circuit but directly from the charger.

4. The electric energy storage system as defined in claim 2, wherein the switch control section is operable, with respect to each of a plurality of groups set by grouping the plurality of electric energy storage units, to sequentially switch the switches according to progress of the charging, based on a detection result from the voltage detection section and in a time division manner, so as to control a number of at least one of the plurality of electric energy storage units to be charged not via the balancing circuit but directly from the charger.

5. The electric energy storage system as defined in claim 3, wherein the switch control section is further operable to perform one or more times, after switching the switches for a predetermined number of times, with respect to each of groups set by re-grouping the plurality of electric energy storage units such that the number of the groups set by the re-grouping is greater than the number of the groups after switching the switches for the predetermined number of times, subsequent sequential switching of the switch according to progress of the charging, based on a detection result from the voltage detection section and in a time division manner, so as to control a number of at least one of the plurality of electric energy storage units to be charged not via the balancing circuit but directly from the charger.

6. The electric energy storage system as defined in claim 4, wherein the switch control section is further operable to perform one or more times, after switching the switches for a predetermined number of times, with respect to each of groups set by re-grouping the plurality of electric energy storage units such that the number of the group set by the re-grouping is greater than the number of the group after switching the switches for the predetermined number of times, subsequent sequential switching of the switch according to progress of the charging, based on a detection result from the voltage detection section and in a time division manner, so as to control a number of at least one of the plurality of electric energy storage units to be charged not via the balancing circuit but directly from the charger.

7. An electric energy storage system comprising:
an electric energy storage module having a plurality of electric energy storage units connected in series, each of the plurality of electric energy storage units having one electric energy storage bank or a plurality of electric energy storage banks connected in series;
a load to which electric energy is to be supplied from at least one of the electric energy storage banks;
a balancing circuit connected to the electric energy storage module to correct a variation in charged/discharged state between the electric energy storage banks;
a voltage detection section configured to detect a voltage across the electrical energy storage module, across one or more of the electric energy storage banks, or across the load;
a plurality of taps led out, respectively, from one of opposite terminals of the electric energy storage module, from the other terminal of the electric energy storage module and from one or more of a plurality of series-connection points between the electric energy storage units; and
a switch control section configured to switch switches, wherein at least one of the switches is connected to one of the opposite terminals of the electric energy storage module, to the other terminal of the electric energy storage module, or to at least one of the plurality of series-connection points, the switch control section configured to allow one of the plurality of taps to be connected to one of opposite terminals of the load, the switch control section being operable, during a discharging period, to sequentially switch the switches according to the discharged state, by sequentially turning on one switch at a time or by sequentially turning on a pair of switches at a time, based on a detection result from the voltage detection section, the switch control section configured to control a first number of at least one of the plurality of electric energy storage units to bypass the load and be discharged via the balancing circuit when a second number of at least one of the plurality of electric energy storage units bypasses the balancing circuit and is discharged directly to the load.

8. The electric energy storage system as defined in claim 7, wherein the switch control section is configured to switch the switches, the switch control section configured to allow one of the plurality of taps to be connected to one of opposite terminals of the load by a first switch of the switches and another of the plurality of taps to be connected to the other terminal of the load by a second switch of the switches.

9. The electric energy storage system as defined in claim 8, wherein the switch control section is operable, with respect to each of a plurality of groups set by grouping the plurality of electric energy storage units, to sequentially switch the switches according to the discharged state, based on a detection result from the voltage detection section and in a time division manner, so as to control a number of at least one of the plurality of electric energy storage units to be discharged from at least one of the electric energy storage units not via the balancing circuit but directly to the load.

10. The electric energy storage system as defined in claim 9, wherein the switch control section is further operable to perform one or more times, after switching the switches for a predetermined number of times, with respect to each of at least one group set by re-grouping the plurality of electric energy storage units such that the number of the at least one group set by the re-grouping is less than the number of the groups after switching the switches for the predetermined number of times, at least one subsequent sequential switching of the switches according to the discharged state, based on a detection result from the voltage detection section and in a time division manner, so as to control a number of at least one of the plurality of electric energy storage units to be discharged from at least one of the electric energy storage units not via the balancing circuit but directly to the load.

11. An electric energy storage system comprising:
an electric energy storage module having a plurality of electric energy storage units connected in series, each of the plurality of electric energy storage units having one electric energy storage bank or a plurality of electric energy storage banks connected in series;
a charger configured to charge at least one of the electric energy storage banks;
a balancing circuit connected to the electric energy storage module to correct a variation in charged/discharged state between the electric energy storage banks;
a voltage detection section configured to detect a voltage across the electrical energy storage module, across one or more of the electric energy storage banks, or across the charger;
a plurality of taps led out, respectively, from one of opposite terminals of the electric energy storage module, from the other terminal of the electric energy storage module and from one or more of a plurality of series-connection points between the electric energy storage units; and
a switch control section configured to switch switches, wherein at least one of the switches is connected to one of the opposite terminals of the electric energy storage module, to the other terminal of the electric energy storage module, or to at least one of the plurality of series-connection points, the switch control section configured to allow one of the plurality of taps to be connected to one of opposite terminals of the charger and another of the plurality of taps to be connected to the other terminal of the charger, the switch control section being operable, with respect to each of a plurality of groups set by grouping the plurality of electric energy storage units, to sequentially switch the switches, by sequentially turning on a pair of switches at a time, the switch control section configured to repeatedly charge the same at least one electric energy storage unit directly from the charger when a remaining number of electric energy storage units is charged via the balancing circuit, in a time division manner.

12. An electric energy storage system comprising:
an electric energy storage module having a plurality of electric energy storage units connected in series, each of the plurality of electric energy storage units having one electric energy storage bank or a plurality of electric energy storage banks connected in series;

a load to which electric energy is to be supplied from at least one of the electric energy storage banks;

a balancing circuit connected to the electric energy storage module to correct a variation in charged/discharged state between the electric energy storage banks;

a voltage detection section configured to detect a voltage across the electrical energy storage module, across one or more of the electric energy storage banks, or across the load;

a plurality of taps led out, respectively, from one of opposite terminals of the electric energy storage module, from the other terminal of the electric energy storage module and from one or more of a plurality of series-connection points between the electric energy storage units; and a switch control section configured to switch switches, wherein at least one of the switches is connected to one of the opposite terminals of the electric energy storage module, to the other terminal of the electric energy storage module, or to at least one of the plurality of series-connection points, the switch control section configured to allow one of the plurality of taps to be connected to one of opposite terminals of the load and another of the plurality of taps to be connected to the other terminal of the load, the switch control section being operable, with respect to each of a plurality of groups set by grouping the plurality of electric energy storage units, to sequentially switch the switches, by sequentially turning on a pair of switches at a time, the switch control section configured to repeatedly discharge the same at least one electric energy storage unit directly to the load when a remaining number of electric energy storage units is discharged via the balancing circuit, in a time division manner.

13. The electric energy storage system of claim 1, wherein the switch control section is configured to control the first number of at least one of the plurality of electric energy storage units to be charged, via the balancing circuit, utilizing the second number of at least one of the plurality of electric energy storage units.

14. The electric energy storage system of claim 7, wherein:
the one switch is among a group of switches, each switch of the group of switches comprising a terminal connected to one terminal of the opposite terminals of the load, a first switch of the pair of switches is among a first group of switches, each switch of the first group of switches comprising a first terminal connected to a first one of the opposite terminals of the load, and a second switch of the pair of switches is among a second group of switches, each switch of the second group of switches comprising a second terminal connected to a second one of the opposite terminals of the load.

* * * * *